(12) United States Patent
Laura et al.

(10) Patent No.: US 7,858,698 B2
(45) Date of Patent: Dec. 28, 2010

(54) COMPOSITIONS CONTAINING FUNCTIONALIZED OILS AND POLYOLEFINS

(75) Inventors: Alger E Laura, New Boston, MI (US); Han X Xiao, Bloomfield Hills, MI (US)

(73) Assignee: A-Line Products Corporation, Detroit, MI (US)

( * ) Notice: Subject to any disclaimer, the term of this patent is extended or adjusted under 35 U.S.C. 154(b) by 206 days.

(21) Appl. No.: 11/372,426

(22) Filed: Mar. 9, 2006

(65) Prior Publication Data

US 2007/0191539 A1      Aug. 16, 2007

Related U.S. Application Data

(60) Provisional application No. 60/773,894, filed on Feb. 16, 2006.

(51) Int. Cl.
*C08G 18/08* (2006.01)
*C08L 75/00* (2006.01)

(52) U.S. Cl. .................................................... 524/589

(58) Field of Classification Search ................... 524/589
See application file for complete search history.

(56) References Cited

U.S. PATENT DOCUMENTS

| | | | |
|---|---|---|---|
| 1,979,260 A | | 11/1934 | Gauerke |
| 3,318,828 A | * | 5/1967 | Seiner .................... 554/106 |
| 3,412,054 A | | 11/1968 | Milligan et al. |
| 4,046,729 A | | 9/1977 | Scriven et al. |
| 4,066,591 A | | 1/1978 | Scriven et al. |
| 4,070,421 A | | 1/1978 | Etter, Jr. |
| 4,224,379 A | | 9/1980 | Ichinose et al. |
| RE30,612 E | * | 5/1981 | Harris et al. ............... 106/253 |
| 4,277,380 A | | 7/1981 | Williams et al. |
| 4,603,188 A | * | 7/1986 | Kusakawa et al. ........... 528/60 |
| 4,608,415 A | | 8/1986 | Nakajima et al. |
| 4,695,508 A | | 9/1987 | Kageyama et al. |
| 4,898,919 A | * | 2/1990 | Ueda et al. ................ 525/127 |
| 4,954,573 A | | 9/1990 | Fry et al. |
| 4,975,207 A | | 12/1990 | Lee |
| 4,981,730 A | | 1/1991 | Zaleski |
| 5,102,944 A | | 4/1992 | Ohmika et al. |
| 5,130,197 A | | 7/1992 | Temple |
| 5,227,198 A | | 7/1993 | Laura et al. |
| 5,233,924 A | | 8/1993 | Ohba et al. |
| 5,258,444 A | * | 11/1993 | Zezinka et al. ............. 524/501 |
| 5,300,326 A | * | 4/1994 | Zezinka et al. ........... 427/385.5 |
| 5,300,363 A | | 4/1994 | Laura et al. |
| 5,334,690 A | * | 8/1994 | Schafheutle et al. ......... 528/71 |
| 5,427,856 A | | 6/1995 | Laura et al. |
| 5,494,960 A | * | 2/1996 | Rolando et al. ............ 524/591 |
| 5,504,145 A | * | 4/1996 | Treasurer .................. 524/591 |
| 5,620,747 A | | 4/1997 | Laura et al. |
| 5,626,915 A | | 5/1997 | Laura et al. |
| 5,629,046 A | | 5/1997 | Laura et al. |
| 5,693,423 A | | 12/1997 | Laura et al. |
| 5,756,566 A | | 5/1998 | Laura |
| 5,804,640 A | | 9/1998 | Laura et al. |
| 5,880,190 A | | 3/1999 | Laura |
| 6,072,019 A | * | 6/2000 | Sengupta .................... 528/59 |
| 6,245,695 B1 | * | 6/2001 | Maruo et al. ............... 442/136 |
| 6,297,312 B1 | * | 10/2001 | Wang ........................ 524/507 |
| 6,562,901 B1 | | 5/2003 | Asami et al. |
| 6,593,423 B1 | | 7/2003 | Kondos et al. |
| 6,790,271 B2 | | 9/2004 | Thames et al. |
| 6,939,432 B2 | * | 9/2005 | Chao et al. ................. 156/333 |
| 6,987,144 B2 | | 1/2006 | Anderson et al. |
| 2001/0011114 A1 | * | 8/2001 | Uebayashi et al. .......... 524/195 |

OTHER PUBLICATIONS

CP 349W MSDS.*
CEPA Environmental Registry 68609-36-9 data sheet.*
U.S. Appl. No. 10/723,062.

* cited by examiner

*Primary Examiner*—Mark Eashoo
*Assistant Examiner*—Angela C Scott
(74) *Attorney, Agent, or Firm*—Harness, Dickey & Pierce, P.L.C.

(57) ABSTRACT

A composition comprises a polyolefin having electronegative substituents and a material comprising a plurality of hydrocarbyl groups, each hydrocarbyl group having at least seven carbon atoms.

21 Claims, No Drawings

US 7,858,698 B2

COMPOSITIONS CONTAINING FUNCTIONALIZED OILS AND POLYOLEFINS

FIELD OF THE DISCLOSURE

The disclosure concerns compositions including coatings, inks, sealants, and adhesive compositions, that may be applied to substrates, particularly plastic substrates, as well as methods for making and applying such compositions. The disclosure also concerns plastic composites.

BACKGROUND OF THE DISCLOSURE

Plastic components are used in many applications that require adhesives or in which it is desirable to finish the component with a protective or decorative coating. It is difficult to adhere coating and adhesive compositions to some plastics, such as polyolefins. Waterborne chlorinated polyolefin coating compositions, such as described in Laura, U.S. Pat. Nos. 5,880,190, 5,804,640, 5,756,566, 5,693,423, 5,629,046, 5,626,915, 5,620,747, 5,427,856, 5,300,363, and 5,227,198, each of which is incorporated herein by reference, may be used to coat polyolefins and other plastics with good adhesion. In some applications and for some types of plastics, however, it would be desirable to improve adhesion or physical properties of coatings, inks, or adhesives that are used with such plastics.

SUMMARY OF THE DISCLOSURE

The disclosure describes a composition comprising (a) a polyolefin having electronegative substituents, such as acid groups, anhydride groups, and halogen groups, particularly comprising chlorine groups, and (b) a material comprising a plurality of hydrocarbyl groups having at least seven carbon atoms, preferably seven to about nineteen carbon atoms, and further comprising at least one member selected from urethane groups, urea groups, and combinations of urethane and urea groups. "Hydrocarbyl groups" are monovalent radicals in which carbon atoms are bound only to hydrogens and other carbon atoms; as used in describing the invention, hydrocarbyl groups may be aliphatic (including cycloaliphatic), aromatic, and combinations of these (akylaromatic or arylaliphatic). The material comprising hydrocarbyl groups may be covalently bonded to the polyolefin having electronegative substituents or may be part of a material independent of the polyolefin. The material having the hydrocarbyl groups may have functional groups, such as hydroxyl groups, epoxide groups, acid groups, anhydride groups, isocyanate groups, and so on. The hydrocarbyl groups may be saturated or unsaturated, and may be derived, for example and without limitation, from fatty acids, fatty alcohols, and fatty oils. The composition may be a coating composition or an adhesive that may be applied to a surface.

In certain embodiments, the present compositions include a polyolefin with electronegative substituents such as a polyolefin that is chlorinated, acid-containing, and/or anhydride-containing and reaction product of a polyisocyanate and a hydroxyl-functional ester of (a) an unsaturated fatty acid or reactive derivative thereof and (b) a polyol having at least three primary hydroxyl groups. The hydrocarbyl groups may be derived from drying oil or a non-drying oil. The reaction product may have functional groups that preferably are capable of reacting with a crosslinker reactive with the functional groups. The composition may be a coating composition or an adhesive.

A further embodiment provides a coating composition comprising a polyolefin having electronegative groups and a polyurethane prepared by reacting a mixture comprising at least a polyisocyanate and a hydroxyl-functional ester of a fatty acid. The ester may be prepared by reacting together a saturated or unsaturated fatty acid or reactive derivative thereof and a polyol having at least three hydroxyl groups. The fatty acid may have from one to about three unsaturated groups or carbon-carbon double bonds. The unsaturated fatty acid may be in the form of a reactive derivative, such as a triglyceride (glycerol tri-ester) of the fatty acid. The composition may include a crosslinker reactive with hydroxyl groups, such as an aminoplast. The composition may be a coating composition or an adhesive. The composition may include a drier to promote reaction of oxygen with the unsaturated group(s) of the fatty acid.

Aqueous embodiments of the invention include an aqueous coating composition comprising a polyolefin having electronegative substituents and a water-soluble or water-dispersible polyurethane having a plurality of pendant hydrocarbyl groups, wherein said hydrocarbyl groups have from 7 to about 19 carbon atoms. The polyurethane may be anionic, cationic, or nonionic.

Further provided is an aqueous coating composition, comprising a polyolefin having electronegative substituents and an anionic polyurethane having a plurality of hydrocarbyl groups. The polyurethane may be prepared by reacting together a mixture comprising (a) a hydroxyl-functional ester of a fatty acid and a polyol having at least three hydroxyl groups, (b) a dialkylol alkanoic acid, and (c) a polyisocyanate to provide an isocyanate-functional, carboxylic acid-functional polyurethane; then, dispersing the isocyanate-functional, carboxylic acid-functional polyurethane in water in the presence of an isocyanate-reactive polyamine and a sufficient amount of a basic compound for salting the carboxylic acid groups to form a stable polyurethane dispersion. Preferably, the carboxylic acid groups are salted with ammonia or a tertiary amine, preferably a tertiary monoamine. The tertiary amine may be an aminoalcohol.

In another embodiment, the invention provides an aqueous coating composition comprising an ester of a polyolefin having electronegative substituents, particularly a chlorinated polyolefin and/or an acid-functional chlorinated polyolefin and a hydroxyl-functional polyurethane having pendant hydrocarbyl groups. The hydrocarbyl groups may be unsaturated, and the composition may further include a drier.

Still further, the invention provides an aqueous coating composition, comprising a material prepared by: reacting a mixture comprising (a) an hydroxyl-functional ester of an unsaturated fatty acid and a polyol, the polyol having at least three hydroxyl groups, (b) a dialkylol alkanoic acid, and (c) a polyisocyanate to form an isocyanate-functional, carboxylic acid-functional polyurethane; then dispersing the isocyanate-functional, carboxylic acid-functional polyurethane in an aqueous dispersion of a polyolefin having electronegative substituents in the presence of an isocyanate-reactive polyamine and ammonia or a tertiary amine (which may be a monoamine).

Another embodiment provides an aqueous composition comprising a mixture of dispersed polyolefin comprising electronegative substituents and a dispersed, anionic polyurethane having a plurality of pendant hydrocarbyl groups each having from 7 to about 19 carbon atoms. The pendant hydrocarbyl groups may independently of one another have from one to three carbon-carbon double bonds. The double bonds may be conjugated.

A two-part adhesive composition of the invention comprises a first part comprising a polyolefin having electronegative substituents such as chlorine radicals or acid groups such as carboxylic acid groups, and a hydroxyl-functional ester of an unsaturated fatty acid and a polyol having at least three hydroxyl groups and a second part comprising a polyisocyanate. The two parts of the adhesive are combined just prior to use to prevent premature reaction. The combined two parts are applied between two surfaces, preferably plastic (e.g., polyolefin) surfaces and cured to adhere the surfaces together.

Yet further, the invention provides a method of preparing a dispersion, comprising reacting together a mixture comprising (a) an hydroxyl-functional ester of an unsaturated fatty acid and a polyol having at least three hydroxyl groups, (b) a dialkylol alkanoic acid, and (c) a polyisocyanate to form a reaction product, neutralizing at least a portion of the alkanoic acid groups of the reaction product, and adding to the reaction product an aqueous dispersion of a polyolefin having electronegative substituents to form a dispersion comprising the reaction product and the chlorinated polyolefin. In one embodiment, the reaction product is isocyanate functional and is further reacted with a polyamine after or during forming the dispersion.

Still further, the invention provides a method of preparing a composition by combining a hydroxyl-functional material having a plurality of hydrocarbyl groups of at least seven carbon atoms and a polyolefin having electronegative substituents to form a mixture, reacting the mixture with a polyisocyanate and the solution to form a polyurethane product, and dispersing the polyurethane product in water. The reaction mixture may further include a dialkylol alkanoic acid, and then the polyurethane may be at least partially neutralized before or during dispersing in water.

In another embodiment, the invention provides a method of preparing a composition by reacting a hydroxyl-functional material having a plurality of hydrocarbyl groups of at least seven carbon atoms with a polyolefin having electronegative substituents to form a first product; reacting a mixture comprising a polyisocyanate and the first product to form a polyurethane product; and dispersing the polyurethane product in water. The reaction mixture may further include a dialkylol alkanoic acid in forming the polyurethane, which may then be at least partially neutralized before or during dispersing in water.

In still another embodiment, the invention provides a method of preparing a composition by combining together a dispersion of polyolefin having electronegative substituents and a dispersion of a polyurethane having a plurality of pendant hydrocarbyl groups of at least seven carbon atoms.

The invention provides coating and adhesive compositions, particularly for plastic substrates. In one aspect, the invention provides an adhesive composition comprising a polyolefin having electronegative substituents and a blocked isocyanate-functional polyurethane having a plurality of pendant hydrocarbyl groups with 7 to about 19 carbon atoms. Two surfaces, particularly plastic surfaces, are adhered together by applying the adhesive between the two surfaces, then heating to unblock the polyurethane and cure the applied adhesive.

In another embodiment, the invention provides an adhesive composition comprising a polyolefin having electronegative substituents, a hydroxyl-functional ester of an unsaturated fatty acid and a polyol having at least three hydroxyl groups, and blocked polyisocyanate.

In still further embodiments, the invention provides plastic composite compositions comprising a binder and a filler, in which the binder is a mixture or a covalent graft of a polyolefin having electronegative substituents and a polyurethane having pendant hydrocarbyl groups of at least seven carbons each. The filler may be a particulate filler, a fiber filler, or a combination of filler.

The coating compositions provided are useful in coating polyolefin substrates and other troublesome metallic and synthetic substrates. The adhesive compositions provided are useful in adhering polyolefin and other plastic substrates.

"A" and "an" as used herein indicate "at least one" of the item is present; a plurality of such items may be present, when possible. Other than in the working examples provided at the end of the detailed description, all numerical values of parameters (e.g., of quantities or conditions) in this specification, including the appended claims, are to be understood as being modified by the term "about." "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring such parameters. Throughout the specification ranges are used as shorthand for describing every value within the range. All values within the range are hereby disclosed and any value within the range can be selected as an endpoint of a disclosed range.

DETAILED DESCRIPTION OF THE PREFERRED EMBODIMENTS

The following description of the preferred embodiment(s) is merely exemplary in nature and is in no way intended to limit the invention, its application, or uses.

The compositions of the invention include a polyolefin having electronegative substituents and a plurality of aliphatic hydrocarbyl groups having at least seven carbon atoms.

The electronegative substituents are sufficiently electronegative to provide a desired degree of adhesion to a substrate on which the composition is applied. Suitable electronegative substituents include halogen radical, acid groups, and anhydride groups. These may be used in any combination. In certain embodiments, the electronegative substituents comprise at least chlorine radicals (that is, the polyolefin is at least chlorinated). In certain embodiments, the electronegative substituents include carboxylic acid and/or carboxylic acid anhydride groups in addition to halogen, particularly chlorine, groups.

In certain embodiments, the compositions and methods of the present invention include a chlorinated polyolefin. Chlorinated polyolefins typically have a chlorine content of at least about 10%, preferably at least about 15% by weight and up to about 40%, preferably up to about 30% by weight. In certain embodiments, chlorinated polyolefins having a chlorine content of up to about 26% by weight are preferred. Even more preferred are chlorine contents of up to about 24% weight. In certain preferred embodiments the chlorine content is from about 18% to about 22% by weight. Typical examples of useful chlorinated polyolefin materials are those having a chlorine content of from about 10 to about 40 weight percent. In some embodiments, the chlorinated polyolefin material may have from about 10 to about 30 weight percent chlorine content. The chlorinated polyolefin may be prepared according to known methods, such as those described in U.S. Pat. Nos. 4,070,421 and 4,954,573, which are hereby expressly incorporated by reference. Olefins that may be used to prepare the polyolefin include ethylene, propylene, 1-butene, cis-2-butene, trans-2-butene, isobutylene, 1-pentene, 1-hexene, 1-octene, and combinations of these. In certain embodiments, the polyolefin is a homopolymer or copolymer of ethylene or propylene, or a copolymer of both ethylene and propylene. Some other examples of chlorinated polyolefins can be found in U.S. Pat. Nos. 4,683,264; 5,102,944; and 5,319,032, each of which is incorporated herein by reference. Chlorinated polyolefin materials are commercially available from various sources, including Eastman Chemical Company, Kingsport, Tenn.

The chlorinated polyolefin material may have a number average molecular weight of at least about 2000. In certain embodiments, the chlorinated polyolefin material may have a number average molecular weight of at least about 8,000. The chlorinated polyolefin material may also have a number average molecular weight of at least about 10,000, preferably at least about 13,000. The chlorinated polyolefin material may have a number average molecular weight of up to about 100,000. In certain embodiments, the chlorinated polyolefin material may have a number average molecular weight of up to about 75,000. The chlorinated polyolefin material may also have a number average molecular weight of up to about 50,000. The chlorinated polyolefin can have a weight average molecular weight of at least about 5,000, preferably at least about 10,000, more preferably at least about 20,000, and even more preferably at least about 25,000. The chlorinated polyolefin can have a weight average molecular weight of up to about 150,000, preferably up to about 125,000, more preferably up to about 120,000, even more preferably up to about 100,000, and still more preferably up to about 80,000. Number and weight average molecular weights may be determined by gel permeation chromatography using a polystyrene standard.

The chlorinated polyolefins may be based on grafted or ungrafted polyolefins such as, without limitation, chlorinated polypropylene, chlorinated polybutene, chlorinated polyethylene, and mixtures thereof. The non-grafted olefin polymer for chlorination can be homopolymers of alpha monoolefins with 2 to 8 carbon atoms, and the copolymers can be of ethylene and at least one ethylenically unsaturated monomer like alpha monoolefins having 3 to 10 carbon atoms, alkyl esters with 1 to 12 carbon atoms of unsaturated monocarboxylic acids with 3 to 20 carbon atoms, and unsaturated mono- or dicarboxylic acids with 3 to 20 carbon atoms, and vinyl esters of saturated carboxylic acids with 2 to 18 carbon atoms.

The graft polyolefins are reaction products of an alpha-olefin polymer and a grafting agent. The alpha-olefin homopolymer of one or copolymer of two alpha-olefin monomers with two to eight carbon atoms can include: a) homopolymers such as polyethylene and polypropylene, and b) copolymers like ethylene/propylene copolymers, ethylene/1-butene copolymers, ethylene/4-methyl-1-pentene copolymers, ethylene/1-hexene copolymers, ethylene/1-butene/1-octene copolymers, ethylene/1-decene copolymers, ethylene/4-ethyl-1-hexene copolymers, and ethylene/4-ethyl-1-octene copolymers. Chlorinated grafted polypropylene can be prepared by solution chlorination of a graft-modified polypropylene homopolymer or propylene/alpha-olefin copolymer. Such grafting polymerization is usually conducted in the presence of a free radical catalyst in a solvent which is inert to chlorination. Fluorobenzene, chlorofluorobenzene carbon tetrachloride, and chloroform and the like are useful solvents. Typically, such grafted polypropylenes are those base resins that have been grafted with an alpha, beta-unsaturated polycarboxylic acid or an acid anhydride of an alpha, beta-unsaturated anhydride to form an acid- and/or anhydride-modified chlorinated polyolefin. Suitable grafting agents generally include maleic acid or anhydride and fumaric acid and the like.

The polyolefin may include acid groups or anhydride groups. Chlorinated polyolefins can further include acid and/or anhydride groups. Examples of unsaturated acids that can be used to prepare an modified, chlorinated polyolefin include, without limitation, acrylic acid, methacrylic acid, maleic acid, citraconic acid, fumaric acid, the anhydrides of these. The acid content of the polyolefin is preferably from about 0.5% to about 6% by weight, more preferably from about 1% to about 3% by weight. Acid numbers of from about 50 to about 100 mg KOH/g may be preferred for the polyolefin, particularly for waterborne compositions. Also, the polyolefin polymer can be a chlorosulfonated olefin polymer or a blend of a halogenated polyolefin polymer and/or a polyolefin with acid and/or anhydride groups with a chlorosulfonated olefin polymer, where chlorosulfonation may be effected by reaction of the grafted or non-grafted polyolefin with a chlorosulfonating agent.

In certain embodiments, the polyolefin may have an acid number of from about 1 to about 75 mg KOH/g, preferably from about 5 to about 45 mg KOH/g. In certain embodiments an acid number of about 10 to about 35 mg KOH/g is preferred, but optimum acid numbers will depend upon whether the composition is to be waterborne or not, molecular weight of the polyolefin, and substituents that may be present on the polyolefin.

In certain embodiments the compositions of the invention may contain polyolefins having electronegative substituents that have a softening point in the range from 40° C. to 150° C. In certain embodiments a softening point in the range from 40° C. to 120° C. or in the range from 40° C. to 110° C. may be preferred.

The polyolefin having electronegative substituents may be modified in various ways known in the art. In one preferred embodiment, the polyolefin is phenolic-modified. The polyolefin may not contain any halogen but instead may contain carboxyl or anhydride groups.

The compositions also comprise aliphatic hydrocarbyl groups having at least seven carbon atoms. In some embodiments, the hydrocarbyl groups may have up to thirty-one carbon atoms; in some embodiments, the hydrocarbyl groups may have up to twenty-one carbon atoms; or the hydrocarbyl groups may have up to nineteen carbon atoms. In certain embodiments, the hydrocarbyl groups are unsaturated. The hydrocarbyl groups may include a conjugated group of at least two aliphatic carbon-carbon double bonds. The composition may include a sufficient amount of unsaturated groups to be curable through oxidative crosslinking. In various embodiments, compositions of the invention containing unsaturated hydrocarbyl groups also contain driers for curing the compositions. Nonlimiting examples of hydrocarbyl groups include octyl, 2-ethylhexyl, nonyl, decyl, dodecyl, undecyl, lauryl, oleyl, myristyl, stearyl, lineolenyl, lineoleyl, merystyl, palimyl, and eleostearyl groups.

The plurality of aliphatic hydrocarbyl groups are covalently bonded in a material. The material including a plurality of hydrocarbyl groups may be monomeric, oligomeric, or polymeric. The hydrocarbyl groups may be covalently bonded to the polyolefin having electronegative substituents, or may be a part of a separate material, or both. In certain embodiments, the bound hydrocarbyl groups have from seven to twenty-one carbon atoms, or have seven to nineteen carbon atoms. The hydrocarbyl groups may be derived from fatty acids and/or fatty alcohols or both through reaction of the carboxyl or hydroxyl group. The hydrocarbyl groups may also be derived from esterifiable derivatives of fatty acid, particularly di- or tri-glycerides of fatty acids, such as may be present in admixture in fatty oils such as plant oils.

Nonlimiting examples of monomeric materials having covalently bound hydrocarbyl groups include fatty acid esters of polyols and fatty alcohol esters of polycarboxylic acids. Such fatty esters may be formed by reaction of fatty acids or their esterifiable derivatives, e.g., di- or tri-glycerides, with a polyol or by reaction of a fatty alcohol with a polycarboxylic acid or anhydride thereof. Nonlimiting examples of suitable fatty acids, fatty acid diglycerides, fatty acid triglycerides, and fatty alcohols include pelargonic acid, lauric acid, 1-tetradecanol (myristyl alcohol), 2-tetradecanol, lauric anhydride, unsaturated 14-carbon alcohols including cis-9-tetradecen-1-ol, myristoleic acid, myristic acid, myristic anhydride, oleic acid, oleic anhydride, oleyl alcohol, lineoleic acid, linoleic anhydride, linolenic acid, stearic acid, stearic anhydride, farnesol, palmitoleic acid, cis-11-hexadecen-1-ol, palmitic acid, cetyl alcohol, hexadecanol, heptyldecanoic acid, heptadecanol, octadecanol, linseed oil, tung oil, coconut oil, corn oil, cottonseed oil, olive oil, palm oil, palm kernel oil, peanut oil, soybean oil, eleostearic acid, catalpic acid, punicic acid, calendic acid, jacaric acid, parinaric acid, bosseopentaenoic acid, and the like. Nonlimiting examples of suitable polyols include alkylene glycols and polyalkylene glycols such as ethylene glycol, propylene glycol, diethylene glycol, triethylene glycol, and neopentyl glycol; 1,4-butanediol, 1,6-hexanediol, 1,4-cyclohexane dimethanol, glycerine, trimethylolpropane, trimethylolethane, pentaerythritol, 2,2,4-trimethyl-1,3-pentanediol, hydrogenated bisphenol A, trimethylolbutane, 3,5,5-trimethyl-2,2-dihydroxymethylhexane-1-ol, glycerol, 1,2,6-hexane triol, ditrimethylolpropane, diglycerol and ditrimethylolethane, and so on. Nonlimiting examples of suitable polyacids or anhydrides include phthalic acid, isophthalic acid, terephthalic acid, hexahydrophthalic acid, tetrahydrophthalic acid, pyromellitic acid, succinic acid, azeleic acid, adipic acid, 1,4-cyclohexanedicarboxylic acid, dodecane-1,12-dicarboxylic acid, citric acid, trimellitic acid, and anhydrides of these (e.g., phthalic anhydride, succinic anhydride).

In certain embodiments, the monomeric material incorporating the hydrocarbyl groups has one or more functional groups. Examples of such functional groups include, without limitation, hydroxyl groups, isocyanate groups, epoxide groups, carboxyl groups, amino groups, anhydride groups, and so on, as well as combinations of functional groups. In describing this invention, a material having one or more hydrocarbyl groups and one or more functional groups is referred to as a "functionalized hydrocarbyl material." The functionalized material may have one or more aliphatic conjugated groups. A functionalized material of this kind is referred to in this description as a "functionalized oil." In certain preferred embodiments, the composition includes a functionalized oil that has at least two functional groups other than unsaturated carbon-carbon bonds. Compositions of the invention including such functional materials may further include curing agents reactive with the functional groups for curing the compositions, and compositions of the invention including functionalized oils may also include driers for curing the compositions.

In one aspect of these embodiments, the functionalized hydrocarbyl materials or functionalized oils are esters formed using a polyol compound having at least three hydroxyl groups and a di- or triglyceride of one or more fatty carboxylic acids. These acids may have an aliphatic conjugated group of at least two aliphatic carbon-carbon double bonds. A "conjugated group" refers in this description to an aliphatic conjugated group. The esters may be formed with at least 50% by weight of carboxylic acids having a conjugated group. The esters may be formed with higher amounts of carboxylic acids having conjugated groups, for example at least about 75% of the acids may have conjugated groups. In some embodiments, the conjugated group may have three conjugated double bonds. The reaction conditions may be selected so that at least 80% of the double bonds remain unreacted.

Examples of preferred fatty acids are α-eleostearic acid, catalpic acid, punicic acid, calendic acid, jacaric acid (all C18 acids having 3 conjugated double bonds), α-parinaric acid (a C18 acid having 4 conjugated double bonds) and bosseopentaenoic acid (a C20 acid having 4 conjugated double bonds).

Certain plant or animal oils are useful starting materials. The oils are mainly di- and trigylcerides of a mixture of fatty acids. In certain preferred embodiments, at least 50% (preferably at least 70%, more preferably at least 75%) by weight of the fatty acids in at least one of the oils used as a starting material (if a mixture of oils is used) contain a conjugated group the conjugated group being one containing at least 2, more preferably at least 3, aliphatic carbon-carbon double bonds in conjugation. Oils of this type may contain varying amounts of non-glyceride components such as phosphatides, sterols, tocopherols, fatty alcohols, hydrocarbons and coloring chemicals or pigments such as chlorophyll, carotene, xanthophyll and certain enzymes. Crude oils may also contain some residual biological matter and seed particles. However, the oil is preferably refined to remove these impurities before being functionalized.

In certain embodiments, a particularly preferred oil is tung oil. Tung oil contains a high proportion of glycerides of α-eleostearic acid and is readily available in commercial quantities.

Mixtures of oils can be used to make functionalized oils, including mixtures of oils as described above with oils that contain lower proportions of fatty acids with conjugated groups, and/or oils that do not contain conjugated groups. Other oils may be, for example, drying oils like linseed oil or dehydrated castor oil, semi-drying oils such as soybean oil, or non-drying oils such as canola oil, corn oil, or vegetable oil. In some embodiments of the invention, these oils with lower proportions of fatty acids with conjugated groups and/or oils that do not contain conjugated groups preferably constitute no more than about 75%, more preferably no more than 60%, and most preferably no more than 50% of the combined weight of all starting oils.

In addition, the starting material for forming a functionalized oil may include or be derived from fatty acids that have been treated to introduce conjugation, particularly so that the hydrocarbyl group contains at least 2, preferably at least 3 double bonds in conjugation. Suitable methods for introducing conjugation into fatty acid-containing oils are described in EP 0 736 593, U.S. Pat. Nos. 5,719,301 and 5,942,058, all incorporated herein by reference. The starting material for forming a functionalized oil may also include fatty acids without conjugated unsaturation and esterifiable (including transesterifiable) derivatives of these such as di- and triglycerides.

In certain embodiments, most preferred starting materials are plant oils containing glycerides of fatty acids in which at least 75% of the fatty acids contain 3 or 4 aliphatic carbon-carbon double bonds in conjugation. The most preferred starting material is tung oil.

The oil may be functionalized by reaction with a polyol to introduce hydroxyl groups. In certain preferred embodiments, the polyol is one that contains at least three primary hydroxyl groups/molecule and has a melting temperature of 220° C. or below, preferably 200° C. or below. It has been found that polyol compounds meeting these parameters tend to react with oils having conjugated groups at relatively mild conditions of temperature (preferably below 230° C., more preferably 120-220° C., especially 160-210° C.) in reasonably short times (such as less than 4 hours, especially from about 1 to about 3 hours) to complete the functionalization reaction without causing the conjugated groups to react significantly. Preferred examples of such polyol compounds include trimethylolpropane, trimethylolethane, di-trimethylolpropane and the like. The polyol is used in equivalent excess to provide a hydroxyl-functionalized oil.

The polyols engage in transesterification reactions with the glyceride compounds in the oil, resulting in an ester interchange between the oil ester groups and the hydroxyl groups of the polyol, to produce a mixture of hydroxyl-functional esters of the fatty acids contained in the oil. The reaction can be idealized as:

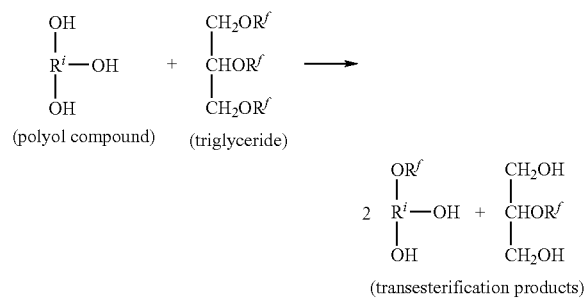

(polyol compound)   (triglyceride)

(transesterification products)

where $R^i$ represents the organic portion of the polyol compound and $R^f$ represents the fatty acid groups from the oil. It is noted that the transesterification reaction proceeds randomly, and the actual reaction products will be a mixture of compounds having zero, one, two and three or more $R^f$ groups. It is preferred to select proportions of starting polyol compounds and oil such that the reaction product contains on average at least two free hydroxyl groups per molecule.

It is preferred to select reaction conditions under which at least 80%, especially at least 90%, most preferably at least 95% of the conjugated groups remain unreacted. In addition to the use of the particular polyol compound described above, and the temperature conditions, the reaction conditions further advantageously include an absence of oxygen, as oxygen tends to promote the autopolymerization of the conjugated groups. Use of nitrogen or other inert atmosphere is sufficient to accomplish this. By preserving the conjugated groups, a functionalized oil having a light color and low viscosity is produced. Further, the preserved conjugated groups are capable of engaging in drying reactions (as in the starting oil) when exposed to oxygen.

The transesterification reaction may be catalyzed to reduce the needed reaction temperatures and/or reduce reaction times. A wide range of transesterification catalysts are useful, including metal salts of inorganic and organic acids, such as calcium, lithium, potassium, magnesium, zinc, cerium and like salts, hydroxides of such metals, as well as litharge or soaps. Solid catalysts have the advantage of being easily filterable from the product functionalized oil. This is advantageous in some applications in which the functionalized oil is to be crosslinked with materials such as aminoplasts such as melamine-formaldehyde, urea-formaldehyde, benzoguan-imine-formaldehyde and/or glycoluril-formaldehyde resins, where the transesterification catalyst tends to inhibit the crosslinking reaction. Suitable amounts of catalysts are up to 1% by weight of the starting materials, preferably from about 0.001 to about 0.1%, more preferably from about 0.005 to about 0.1%.

Functionalized hydrocarbyl materials and functionalized oils having functional groups other than hydroxyl groups may also be used in the composition. In certain embodiments, the compositions of the invention may include functionalized oils having carboxyl groups. Carboxyl groups may be introduced, for example, by reaction of a hydroxyl-functional functionalized oil or functionalized hydrocarbyl material with a cyclic anhydride such as maleic anhydride, succinic anhydride, phthalic anhydride, and so on. Combinations of cyclic anhydrides may be used. Anhydride groups may be introduced, for example, by reacting a hydroxyl-functional functionalized oil or functionalized hydrocarbyl material with a polyanhydride such as polysebacic polyanhydride, polyazelaic polyanhydride, polyadipic polyanhydride, polymeric anhydride, polyanhydride resin (PA-18 by Gulf Research & Development Company), copolymers of maleic anhydride and vinyl ether, copolymers of maleic anhydride and styrene, bisnadic anhydridylbutene, cyclopantanetetracarboxylic dianhydride, benzophenonetetracarboxylic dianhydride, and so on. An epoxide-functionalized oil or epoxide-functionalized hydrocarbyl material may be prepared by reacting a carboxyl-group containing functionalized oil or functionalized hydrocarbyl material with epichlorohydrin. Amine groups may be introduced into the oil or hydrocarbyl material by reaction of a functionalized oil or hydrocarbyl material having carboxyl or epoxide groups with a diamine, preferably an aromatic diamine such as 2,2-bis(4-aminophenyl)propane.

If desired, the functionalized oil or functionalized hydrocarbyl material may be treated to remove unreacted starting materials, colored by-products and the like before being used. The functionalized oil or functionalized hydrocarbyl material is combined with the polyolefin having electronegative substituents in forming various embodiments of the compositions of the invention. In such embodiments, the compositions have a weight ratio of the functionalized oil or functionalized hydrocarbyl material to the halogenated polyolefin that can be from about 1:99 to about 99:1. In some embodiments, a weight ratio of the functionalized oil or functionalized hydrocarbyl material to the polyolefin having electronegative substituents from about 1:1 to about 1:5 is preferred; in other embodiments a weight ratio from about 1:3 to about 3:1 is preferred.

The composition may further include other components, including for example and without limitation other binder or film-forming materials including other polymers or resins and crosslinking agents or curing agents, catalysts suitable for reaction of the particular crosslinker, solvents including water and organic solvents, surfactants, stabilizers, matting agents, wetting agents, rheology control agents, dispersing agents, pigments, fillers, customary coatings additives, and combinations of these. Suitable crosslinking agents are reactive with the functionality on the functionalized oil or functionalized hydrocarbyl material and/or reactive with acid or anhydride groups or other groups of the polyolefin having electronegative substituents.

Film-forming resins or polymers for coating compositions typically have such functional groups as, for example, without limitation, hydroxyl, carboxyl, carbamate, urea, epoxide (oxirane), primary or secondary amine, amido, thiol, silane, and so on and combinations of these. The coating compositions of the invention may further include, without limitation, acrylic polymers, vinyl polymers, polyurethanes, polyesters (including alkyds), polyethers, epoxies, aminoplasts such as melamine resins, and combinations and graft copolymers of these. Also included are polymers in which one kind of polymer is used as a monomer in forming another, such as a polyester-polyurethane, acrylic-polyurethane, or a polyether-polyurethane in which a dihydroxy functional polyester, acrylic polymer, or polyether is used as a monomer in the urethane polymerization reaction. Many references describe film-forming polymers for curable coating compositions and so these materials do not need to be described in further detail here.

A crosslinking or curing agent has, on average, at least about two crosslinking functional groups, preferably more than two crosslinking functional groups. Suitable curing agents for active-hydrogen functional, e.g., hydroxyl-functional, functionalized oil or functionalized hydrocarbyl material include, without limitation, materials having active methylol or methylalkoxy groups, such as aminoplast crosslinking agents or phenol/formaldehyde adducts, curing agents that have isocyanate groups, including blocked isocyanate curing agents; curing agents having epoxide groups; and combinations of these. Examples of preferred curing agent compounds include melamine formaldehyde resins (including monomeric or polymeric melamine resin and partially or fully alkylated melamine resin), urea-formaldehyde resins, benzoguanimine-formaldehyde resins, and/or glycoluril-formaldehyde resins. These resins preferably have low (such a less than 1%, preferably less than 0.5%) free formaldehyde. The crosslinking reaction will in most cases occur at elevated temperatures, typically from about 50-150° C., especially from about 80-130° C.

Suitable melamine-formaldehyde resins that are commercially available include highly methylated resins such as Cymel™ 300, 301, 303, 350 resins; high imino resins such as Cymel™ 322, 323, 325, 327, 328, 345, 385 and 3717; partially methylated resins such as Cymel™ 370, 373 and 380; highly alkylated mixed ether melamine resins such as Cymel 1130, 1131, 1133, 1135, 1141, 1161 and 1168; high imino mixed ether resins such as Cymel™ 202, 203, 254 and 324; n-butylated resins such as Cymel™ 1151, 1156 and 1158; and isobutylated resins such as Cymel™ MI-8-I, MI-11-I and 255-10. Suitable urea-formaldehyde resins include methylated resins such as Beetle™ U-60 and U-65 and butylated resins such as Beetle™ U-80. Suitable benzoguanamine-urea resins include Cymel™ 1123 and 1125. Suitable glycoluril-formaldehyde resins include Cymel™ 1170, 1171, 1172 and 1179. All Cymel™ and Beetle™ resins are available from Cytec Industries, West Paterson, N.J.

The ratio of functionalized oil and melamine-formaldehyde, urea-formaldehyde, benzoguanimine-formaldehyde and/or glycoluril-formaldehyde resin can vary widely, depending on the properties that are desired in the cured polymer. Either the functionalized oil or the melamine-formaldehyde, urea-formaldehyde, benzoguanimine-formaldehyde and/or glycoluril-formaldehyde resin can be used in stoichiometric excess, or roughly the same stoichiometric quantities of each can be used. When excess melamine-formaldehyde, urea-formaldehyde, benzoguanimine-formaldehyde and/or glycoluril-formaldehyde resins are used, these can react with themselves to further cure the mixture. Thus, the blends of functionalized oil and these resins may contain from 5%, preferably from 10% more preferably from 25%, to 95%, preferably to 90%, more preferably to 75% by weight of the functionalized oil.

Other useful curing agents include blocked or unblocked polyisocyanates, such as polyisocyanates containing isocyanurate, biuret, allophanate, imino-oxadiazinedone, urethane, urea and/or uretdione groups. Polyisocyanates containing urethane groups, for example, are obtained by reacting some of the isocyanate groups with polyols, such as trimethylolpropane and glycerol, for example. Non-limiting examples of suitable monomeric isocyanates that may be used as curing agents or as prepare the polyisocyanates mentioned above include isophorone diisocyanate, dicyclohexylmethane diisocyanate, MDI, ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate) (also known as $H_{12}MDI$), the various isomers of toluene diisocyanate (2,6-TDI and 2,4-TDI), meta-xylylenediioscyanate (mXDI) and para-xylylenediisocyanate (pXDI), 4-chloro-1,3-phenylene diisocyanate, 1,5-tetrahydro-naphthalene diisocyanate, 4,4'-dibenzyl diisocyanate, and 1,2,4-benzene triisocyanate, and α,α,α',α'-tetramethylxylylene diisocyanate (TMXDI) can be used. Isocyanate-functional oligomers or low molecular weight reaction products of the monomeric isocyanates may have from 2 to about 6 isocyanate groups. Polyisocyanate crosslinkers may be blocked for example with alcohols or oximes, Unblocked polyisocyanate curing agents are usually formulated in two-package (2K) compositions, in which the curing agent and the film-forming polymer (in this case, at least the functionalized oil or functionalized hydrocarbyl material) are mixed only shortly before application because the mixture has a relatively short pot life. Other crosslinkers that may be used include polyanhydrides (e.g., polysuccinic anhydride), polysiloxanes (e.g., trimethoxy siloxane), tris(alkoxy carbonylamino) triazine (available from Cytec Industries under the tradename TACT). and combinations of these. Functionalized oils or hydrocarbyl materials having carboxyl groups may be included in a composition along with polyepoxide curing agents, such as epoxidized bisphenol A resins (e.g., the diepoxide of bisphenol A) and epoxy esters of polyols. Functionalized oils or hydrocarbyl materials having epoxide groups may be included in compositions of the invention along with curing agents having amine groups, carboxyl groups and anhydride groups. Mixtures of curing agents may be used when appropriate.

The compositions of the invention may include a catalyst to enhance the cure reaction. For example, when aminoplast compounds, especially monomeric melamines, are used as a curing agent, a strong acid catalyst may be utilized to enhance the cure reaction. Such catalysts are well-known in the art and include, without limitation, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that may be useful in the composition of the invention include Lewis acids, zinc salts, and tin salts. In cases where the functionalized oil is formed under conditions that largely preserve the conjugated groups of the functionalized oil, the conjugated unsaturation that can engage in crosslinking to cure the compositions of the invention. These crosslinking reactions will in many cases occur at low temperatures (such as 0-50° C.) in the presence of air or oxygen, particularly when the composition further includes a drier such as manganese, cobalt, calcium, and zirconium metal salts such as manganese napthenate.

Compositions of the invention containing a polyolefin having electronegative substituents, functionalized oil or hydrocarbyl material, and a crosslinker such as an aminoplast crosslinker may be solvent-borne, neat (including powder coatings), or water-borne, depending on the particular characteristics of the components. Solvent-borne compositions include organic solvent or solvents, selected according to the usual methods and with the usual considerations. Nonlimiting examples of useful solvents include, without limitation, methyl ethyl ketone, methyl isobutyl ketone, m-amyl acetate, ethylene glycol butyl ether-acetate, propylene glycol monomethyl ether acetate, xylene, N-methylpyrrolidone, blends of aromatic hydrocarbons, and mixtures of these. In a preferred embodiment of the invention, the solvent is present in the composition in an amount of from about 0.01 weight percent to about 99 weight percent, preferably for organic solventborne compositions from about 5 weight percent to about 70 weight percent, and more preferably for topcoat compositions from about 10 weight percent to about 50 weight percent. Water-borne compositions may include or exclude organic solvents. When water-borne compositions contain organic solvent, the solvent particularly has some affinity for water and may function as a cosolvent.

The pigment may be any organic or inorganic compounds or colored materials, fillers, metallic or other inorganic flake materials such as mica or aluminum flake, and other materials of kind that the art normally includes in such coatings. Pigments and other insoluble particulate compounds such as fillers are usually used in the composition in an amount of 1% to 100%, based on the total solid weight of binder components (i.e., a pigment-to-binder ratio of 0.1 to 1). The pigments and, optionally, fillers are typically included at a pigment to binder ratio of from about 0.1 to about 0.6, preferably from about 0.1 to about 0.25. Suitable pigments and fillers include, without limitation, conductive pigments, including conductive carbon black and graphite pigments and conductive titanium dioxide pigments; non-conductive titanium dioxide and carbon pigments, graphite, magnesium silicate, calcium carbonate, ferric oxide, aluminum silicate, barium sulfate, aluminum phosphomolybdate, aluminum pigments, and color pigments such as metallized and non-metallized azo pigments such as lithol reds, rubine reds, and naphthol reds, oranges, and browns; quinacridone reds and violets, perylene reds, copper phthalocyanine blues and greens, carbazole violet, monoarylide and diarylide yellows, benzimidazolone yellows, tolyl orange, naphthol orange, and rhodamine pigments such as rhodamine yellow and rhodamine blue.

The functionalized oil or functionalized hydrocarbyl material can be used as a reactant to form a variety of polymers or oligomers containing the hydrocarbyl groups. For example, the functionalized oil or hydrocarbyl material reacts with aminoplasts such as melamine-formaldehyde, urea-formaldehyde, benzoguanimine-formaldehyde and/or glycoluril-formaldehyde resins of various types to form an interpenetrating polymer network (IPN) with a plurality of hydrocarbyl groups; with polyisocyanates to form polyurethane polymers having pendant hydrocarbyl groups; with polycarboxylic acids, acid chlorides and/or acid anhydrides to form polyesters and/or precursors for alkyd resins with hydrocarbyl groups; and the like. In a particular example, a hydroxyl- or epoxide-functionalized oil or hydrocarbyl material may be reacted with acid functionality of the polyolefin having electronegative substituents to form a polyolefin having pendant hydrocarbyl groups. In cases where the polymerization reaction is conducted under conditions that largely preserve the conjugated groups of the functionalized oil, the polymer will have corresponding pendant hydrocarbyl groups with conjugated unsaturation that can engage in crosslinking to cure the compositions of the invention. These crosslinking reactions will in many cases occur at low temperatures (such as 0-50° C.) in the presence of air or oxygen, particularly when the composition further includes a drier.

In one preferred embodiment, the inventive composition comprises a polyolefin having electronegative substituents, such as a halogenated or chlorinated polyolefin, and a polyurethane prepared from a hydroxyl-functional ester of a fatty acid. The fatty acid may have from one to about three unsaturated carbon-carbon bonds. In a particularly preferred embodiment, the hydroxyl-functional ester of a fatty acid comprises a hydroxyl-functional functionalized oil or hydroxyl-functional functionalized hydrocarbyl material having two hydroxyl groups for reaction in preparing the polyurethane.

A hydroxyl-functional functionalized oil or hydrocarbyl material can be reacted with a polyisocyanate to form a polyurethane, which may be hydroxyl-terminated or isocyanate-terminated, depending on stoichiometry. A composition containing the polyolefin having electronegative substituents and a hydroxyl-terminated polyurethane may include any of the crosslinkers mentioned above for the compositions including the hydroxyl-terminated functionalized oil or hydrocarbyl material. A drier may also be included when the polyurethane is prepared using a functionalized oil.

Suitable polyisocyanates for preparing the polyurethane include aliphatic, cycloaliphatic, arylaliphatic and aromatic isocyanates and mixtures thereof. Aliphatic isocyanates, especially aliphatic polyisocyanates are preferred in coatings and adhesives applications due to their generally superior light-stability, compared to aromatic polyisocyanates. Non-limiting examples of polyisocyanates are the diisocyanates mentioned above. Mixtures of diisocyanates may be used, such as the commercially available mixtures of 2,4- and 2,6-isomers of toluene diisocyanates. A crude polyisocyanate may also be used in the practice of this invention, such as crude toluene diisocyanate obtained by the phosgenation of a mixture of toluene diamine isomers or the crude diphenyl-methane diisocyanate obtained by the phosgenation of crude methylene diphenylamine. TDI/MDI blends may also be used. Examples of aliphatic polyisocyanates that may be preferred for certain uses of the inventive compositions include methylene bis-(cyclohexylisocyanate, $H_{12}MDI$), isophorone diisocyanate (IPDI) and tetratmethlxylene diisocyanate (TMXDI) as well aromatic diisocyanates such as PAPI (polyarylpolyissocyanate), TDI and MDI, and mixtures of these.

The functionalized oil may be reacted directly with the polyisocyanate by mixing at approximately room temperature or an elevated temperature. The functionalized oil may be used alone to react with the polyisocyanate, or if desired may be used in conjunction with one or more other isocyanate-reactive materials, as described more fully below.

The conjugated groups provided by the functionalized oil can be preserved when the functionalized oil is reacted with the polyisocyanate. This is preferred when making polyurethanes for coating or adhesive applications. Preserving the conjugated groups allows the formation of a polyurethane that can participate in subsequent cross-linking reactions due to the later oxidative cure of the conjugated groups. To prevent the conjugated groups from reacting, the reaction is preferably conducted in the substantial absence of oxygen (such as under a nitrogen blanket) and moderate temperatures (below 180° C., especially below 110° C., most preferably below about 100° C.).

Thus, in one aspect of the invention, the polyurethane-forming reaction is conducted under conditions such that at least 70%, more preferably at least 80%, especially at least 85% of the conjugated groups do not react.

The reaction of the functionalized oil or functionalized hydrocarbyl material and the polyisocyanate is typically catalyzed using urethane catalysts such as tertiary amines, salts and chelates of various metals, particularly tin salts such as dialkyl tin dioctoates, dialkyl tin oxides and the like. The reaction may be performed neat or in a solvent if desired.

The functionalized oil or functionalized hydrocarbyl material will generally be used in conjunction with other isocyanate-reactive materials in making the polyurethane. In addition, blending the functionalized oil or functionalized hydrocarbyl material with another isocyanate-reactive material can facilitate mixing by reducing viscosity and/or increasing compatibility. Suitable other isocyanate-reactive materials include compounds preferably having on average up to about 8, more preferably up to about 6, even more preferably up to about 4 and especially up to about 2 isocyanate-reactive groups per molecule.

A large number of suitable isocyanate-reactive materials are described in columns 3-5 of U.S. Pat. No. 4,394,491 incorporated herein by reference. Among these are polyethers and polyester polyols. If a more flexible, lower glass transition temperature polyurethane is desired, an additional isocyanate-reactive material having an average equivalent weight per isocyanate-reactive group of from about 250 to about 8000, preferably about 500 to about 3000, more preferably about 500 to about 2500, is useful. Particularly preferred are the polyether polyols that are polymers of a $C_{2-4}$ alkylene oxide or tetrahydrofuran. These can be used in admixture with other isocyanate-reactive materials that have equivalent weights as low about 31, if desired. Especially preferred isocyanate-reactive materials are polymers of propylene oxide or block or random copolymers of propylene oxide and ethylene oxide.

Other especially preferred isocyanate-reactive materials are polymers of propylene oxide and polyester polyols, such as 1,4-butandiol adipate polyester polyols.

If a more rigid polyurethane is desired, the isocyanate-reactive materials having an equivalent weight of about 31 to about 200 are useful. Diols are preferred, but when some branching of the polyurethane is desired, higher functionality alcohols are included. Illustrative examples include, without limitation, alkylene glycols and polyalkylene glycols such as ethylene glycol, propylene glycol, diethylene glycol, triethylene glycol, dipropylene glycol neopentyl glycol, 1,4-butanediol, 1,6-hexanediol, 1,4-cyclohexane dimethanol, glycerine, trimethylolpropane, trimethylolethane, pentaerythritol, 2,2,4-trimethyl-1,3-pentanediol, hydrogenated bisphenol A, and hydroxyalkylated bisphenols. Diamines may also be used. Nonlimiting examples of diamines include toluene diamine, diphenylmethane diamine, and the like.

To form a high molecular weight polyurethane, about 0.7 to about 3.0 equivalents of isocyanate groups are provided per equivalent of isocyanate-reactive group. A preferred range is from about 0.95 to about 1.15. Use of more than about 1.5 equivalents of polyisocyanate groups per equivalent of isocyanate-reactive group will favor formation of a low molecular weight polyurethane, unless a trimerization catalyst (such as an alkali metal salt) is used.

In making a high molecular weight polyurethane, it is preferred that the functionalized oil or hydrocarbyl material constitute from about 1 to about 80, preferably from about 1 to about 25, more preferably from about 2 to about 10, especially from about 4 to about 8 weight percent of the total weight of all isocyanate-reactive materials plus the polyisocyanates. The resulting polyurethane will contain corresponding amounts of pendant hydrocarbyl groups. When the hydrocarbyl groups are unsaturated, these amounts provide the polyurethane with sufficient amounts of conjugated groups to engage in oxidative crosslinking (drying).

The compositions of the invention may be aqueous. An aqueous dispersion of a polyolefin having electronegative substituents may be formed by the procedures described in Laura, U.S. Pat. No. 5,756,566, "Aqueous Coating Composition," incorporated herein by reference, with the caveat that polyols and surfactants are optional, not required, materials in the present compositions. Broadly, aqueous dispersions of polyolefins having electronegative substituents are formed by mixing the polyolefin with a base before or during dispersing the polyolefin in water. It is often preferred to use ammonia or an amine, particularly a tertiary amine, with the polyolefin. Nonlimiting example of suitable amines include those mentioned in the Laura patent, particularly triethylamine, 2-amino-2-methyl-1-propanol, and dimethylethanol amine. Ethoxylated and propoxylated amines may also be used. Preferably, the pH of the dispersion is in the range of 7-10.5, and is more preferably the dispersion has a basic pH up to about 9.0. In one embodiment, the dispersion is prepared by melting the polyolefin having electronegative substituents, adding the base and, optionally, other materials, then adding water until a dispersion of the desired solids content is formed. In an alternative method, the base is added to the polyolefin melt along with the water.

The aqueous dispersion of polyolefin having electronegative substituents may also include a surfactant, such as a nonionic surfactant, amphoteric surfactant, or anionic surfactant. Exemplary nonionic materials include, for example, organic materials which contain groups of varying polarity whereby one part of the molecule is hydrophilic and the other is hydrophobic. Examples of such materials include polyethylene polyols, polyvinyl alcohol, polyethers, polyesters and polyhalides. A highly preferred class of nonionic surface active agents or surfactants includes those that belong to the series of nonylphenoxy polyethoxy ethanol surfactants. In particular, these highly preferred surfactants preferably contain about 5 to about 25, and more preferably about 7 to about 15, and still more preferably about 7 to about 10 ethylene oxide groups per molecule of surfactant. Exemplary anionic surface—active agents include materials such as those containing a carboxylate group attached directly to a hydrophobic group, or, in the alternative, where there is an intermediate functionality such as an ester, amide, sulfonamide, or the like. Other useful materials include anionic agents derived from sulfuric or sulfonic acids in which the hydrophobic groups are selected from aliphatic or aromatic groups of varying polarity, such as halides, hydroxyls, ether and/or ester groups. A preferred anionic material is a material such as sodium lauryl sulfate. Preferably, the non-ionic surface active agent or other surface active agent selected is a surfactant and is present in an amount of about 0.05% to about 15%, more preferably about 0.05% to about 10%, still more preferably about 0.1% to about 10%, and still more preferably at a level of about 0.5% to about 7.0%, by weight of the total weight of the composition.

The aqueous dispersion of a polyolefin having electronegative substituents may also include other materials, among them cosolvents such as ethylene glycol, diethylene glycol, triethylene glycol, tetraethylene glycol, propylene glycol, dipropylene glycol, tripropylene glycol, and hexylene glycol as well as other glycols such as 1,3-butylene glycol, and ethoxytriglycol, glycol ethers and glycol ether esters such as propylene glycol monomethyl ether and propylene glycol monomethyl ether acetate; viscosity modifiers such as thickeners; and any of the additives already mentioned above.

If the polyolefin having electronegative substituents bears the plurality of hydrocarbyl groups, they are, of course, dispersed along with the polyolefin. If the composition contains one of the hydrocarbyl materials, functionalized oils, or functionalized hydrocarbyl materials, these may be dispersed using suitable surfactants. A water-soluble or water-dispersible polyurethane made with hydrocarbyl material, functionalized oil, or functionalized hydrocarbyl material, for example carboxyl-functional materials salted with a base or materials containing sufficient amount of polyoxyethylene groups, may be dispersed along with the polyolefin having electronegative substituents or can be added after the polyolefin having electronegative substituents is already dispersed. A crosslinking agent may also be mixed with the polyolefin prior to dispersion, particularly if the crosslinking agent is not water-soluble or water-dispersible. A water-dispersible or water-soluble crosslinking agent may be added after the polyolefin having electronegative substituents is already dispersed.

Among preferred aqueous compositions of the invention are those including polyurethanes with a plurality of hydrocarbyl groups. The polyurethane may be cationic, nonionic, or anionic; preferably, it is anionic or cationic. In certain embodiments, an anionic polyurethane is prepared by reacting together a mixture comprising (a) a hydroxyl-functional ester of a fatty acid and a polyol having at least three hydroxyl groups, (b), an acid-functional diol such as a dialkylol alkanoic acid or a half-ester of a polyol and an anhydride, such as trimellitic anhydride half esters as described in U.S. Pat. No. 4,268,426, and (c) a diisocyanate. The hydroxyl-functional ester may be a functionalized oil or functionalized hydrocarbyl material that has two or three hydroxyl groups on average, preferably two hydroxyl groups. Nonlimiting examples of the acid-functional diol are dimethylolpropionic acid (DMPA) and dimethylolbutanioic acid (DMBA). Illustrative example of diisocyanates have already been mentioned. The reaction mixture may include other materials having at least two, preferably two, isocyanate-reactive groups, including diamines, polyol, and aminoalcohols.

One preferred polyurethane is prepared using a mixture comprising hydroxyl-functional functionalized tung oil, dimethylolpropionic acid, and hydrogenated MDI preferably in an equivalent ratio of about 1 to 1 to 2, respectively. In a preferred embodiment of the invention, a composition is prepared by forming neutralized, hydroxyl-containing polyurethane, heating the polyurethane to a temperature of 90-100° C., adding particulate polyolefin having electronegative substituents to the hot polyurethane, and dispersing the mixture in water to form a dispersion of the invention.

The stoichiometry of the reactants may be adjusted to produce a hydroxyl-functional polyurethane. The acid groups of the polyurethane may be salted with a base and the polyurethane dispersed in water. Preferred nonionic hydrophilic groups include poly(ethylene oxide) chains having a molecular weight of about 100 to 5000 daltons, or random and/or block copolymers of ethylene oxide and another alkylene oxide such as propylene oxide of similar weight, provided that the ethylene oxide constitutes at least about 50% of the total weight of the chain. Polyethylene oxide materials are preferably monofunctional (chain terminating) or difunctional. Difunctional materials having a pendant polyethylene oxide chain react with the polyisocyanate the polymerization reaction to form pendant nonionic groups of this type, whereas those having a backbone of polyethylene oxide will form a polyurethane having the hydrophilic group incorporated into the polyurethane backbone. Pendant polyethylene oxide groups are preferred.

The aqueous polyurethane and the aqueous polyolefin dispersions may then be combined to form a composition of the invention. In an alternative embodiment, the polyurethane and polyolefin having electronegative substituents may be combined before dispersing, then dispersed in water together. In yet another embodiment, one or the other of the polyolefin having electronegative substituents or the hydrocarbyl-containing polyurethane may be dispersed in an aqueous dispersion of the other. That is, for example, an aqueous dispersion of the polyolefin having electronegative substituents may first be formed, then the polyurethane may be dispersed in that aqueous dispersion to form a dispersion of the invention. The composition may further include a curing agent, which may be dispersed along with the polyolefin and/or the polyurethane, or, if it is itself water dispersible, may be added to the dispersed polyolefin and polyurethane with or without prior dispersion of the curing agent. If at least part of the hydrocarbyl groups are unsaturated, particularly if they include conjugated unsaturation, the composition may further include a drier to promote oxidative cure of the composition after application.

In certain embodiments, it is beneficial to cause reaction between the hydroxyl-functional polyurethane and the polyolefin having electronegative substituents. This may be brought about by esterification of acid or anhydride groups on the polyolefin having electronegative substituents with hydroxyl groups of the polyurethane under suitable reaction conditions, such under vacuum at elevated temperature. The grafted polyurethane/polyolefin may then be dispersed as described above.

One method of forming the polyurethane dispersion is to form a water-dispersible, isocyanate-terminated polyurethane (generally, lower molecular weight) containing hydrophilic groups as described above, disperse the polyurethane in the aqueous phase, and then chain-extend the isocyanate-terminated polyurethane to form the dispersed polyurethane particles. Using a water dispersible polyurethane provides several advantages such as promoting the formation of small droplets (which tends to promote stability) and reducing or eliminating the need for external stabilizers.

The polyurethane is dispersed into an aqueous phase, which may already contain the dispersed polyolefin having electronegative substituents, under conditions to make a stable dispersion. If the polyurethane contains acid or base groups, these are preferably neutralized before the polyurethane is dispersed into the aqueous phase. The dispersion preferably contains from about 10% to about 70% by weight, especially from about 30 to 60% by weight, of polyurethane or of the combination of polyurethane and polyolefin.

The particle size of the dispersions is not especially critical provided that the particles remain stably dispersed in the aqueous phase. A preferred range of particle sizes is from about 0.001 to about 50 microns. A more preferred range of particle sizes is from about 0.1 to about 20 microns. The polyurethane and particles of polyolefin having electronegative substituents can constitute from about 1% to about 70% of the total weight of the dispersion. It is generally convenient to prepare the dispersion at a relatively high solids contents (such as from about 30-60%) solids, and then dilute it desired for particular applications.

The aqueous phase of the dispersion may also contain one or more hydrophilic organic solvents to reduce viscosity and/or assist in producing a stable dispersion of the polyurethane particles, but it is preferred to minimize or even eliminate the use of such solvents. The aqueous phase of the final dispersion preferably contains less than 25% by weight of organic compounds having a molecular weight of less than 250, more preferably contains less than 5% by weight of such compounds and most preferably contains less than 1% by weight of such compounds.

Polyurethanes of functionalized oils or functionalized hydrocarbyl materials are preferably prepared under conditions such that the conjugated groups of the functionalized oil remain substantially unreacted. These polyurethanes preferably have an isocyanate contents of about 0.5 wt. % to about 35 wt. % based on the total weight of the polyurethane. Isocyanate-functional polyurethanes are prepared by preferably carrying out the reaction with 1.2-2.5 equivalents NCO:1 equivalent OH. The isocyanate-terminated polyurethanes can be chain extended during forming or after forming an aqueous dispersion. The chain extender is a material that has at least two isocyanate-reactive groups, with preferably a weight per isocyanate-reactive group of about 500 daltons or less, preferably about 150 daltons or less, especially 80 daltons or less, and which reacts with the prepolymer to form urethane and/or urea linkages. Suitable chain extenders include various polyamines and hydrazines. Specific examples of useful chain extenders include ethylene diamine, diethylene triamine, triethylenetetramine, propylene diamine, butylene diamine, cyclohexylenediamine, piperazine, 2-methyl-piperazine, phenylenediamine, toluene diamine, tris(2-aminoethyl)amine, 4,4'-methylene-bis(2-chloroaniline), 3,3'-dichloro-4,4'-diphenyldiamine, 4,4'-diphenyldiamine, 2,6-diaminopyridine, 4,4'-diamine diphenylmethane, isophorone diamine, diethyltoluene diamine, aminoethylethanolamine, and adducts of diethylene triamine.

A chain extender is present in the aqueous medium in which the isocyanate-functional polyurethane is dispersed or is added to the resulting dispersion and caused to react with the polyurethane to form an extended polyurethane or poly (urethane-urea) dispersion. Water-soluble chain extenders are most preferred, as maintaining the chain extender and prepolymer in separate phases helps to retard premature chain extension.

The chain extension may be conducted at an elevated temperature, such as from about 30 to about 100° C., taking care to avoid conditions under which the conjugated groups react to a significant extent. The chain extension reaction may be catalyzed using catalysts of the type described with respect to the preparation of the polyurethane. The dispersion is preferably agitated during the chain extension reaction.

The resulting dispersion contains polyurethane or poly (urethane-urea) particles having pendant hydrocarbyl groups, preferably containing a conjugated group of at least two, preferably three or more, double bonds in conjugation. These conjugated groups will autopolymerize at temperatures ranging from 0° C. or higher in the presence of oxygen. This autopolymerization reaction introduces both intra- and interparticle crosslinking. It also results in the formation of a hydrophobic polymer network. As a result, the dispersion of the invention can be used in a wide variety of coating, adhesive and sealant applications to provide strong, water-resistant polymers. The coatings also tend to exhibit good chemical resistance, good hardness and toughness, and good mechanical properties (such as tensile strength, tensile modulus and elongation).

In most cases, the compositions, including the dispersions, can be applied to a substrate using any convenient application method, such as brushing, spraying, and the like, and are then permitted to cure at room or slightly elevated temperature. Higher curing temperatures can be used if desired, but are not necessary.

In one preferred embodiment, the isocyanate-functional polyurethane is chain-extended in the presence of the dispersed polyolefin having electronegative substituents. As a result the unique dispersion which combines both functional oil-based polyurethane dispersion and polyolefin dispersion with a thermoplastic polymer network resulting in a reinforcement for the mechanical properties and adhesion.

The compositions of the invention may be thermoset (that is, include a curing agent and cure after application) or may be thermoplastic. The polyolefin may have a weight ratio of from 1:1 to 1.5:1 with regard to the functionalized oil, functionalized hydrocarbyl material, or polyurethane and any curing agent present when the composition is to be applied to a polyolefinic (e.g., TPO) substrate. When the composition is to be applied to a polypropylene substrate, the weight ratio of polyolefin to functionalized oil/functionalized hydrocarbyl material/polyurethane and curing agent should be from 1:1 to 1:2. The preferred ratios of polyolefin to functionalized oil or hydrocarbyl material can vary from waterborne to solventborne compositions. In particular, when the functionalized oil or hydrocarbyl material is a polyurethane, isocyanate functionality of the polyurethane may react with carboxyl functionality in a solventborne composition; this reaction is promoted by using an aromatic polyisocyanate, which is faster reacting than an aliphatic polyisocyanate. This reaction is less likely to occur to a significant extent, however, in a waterborne composition where an amine chain extender is used to extend the isocyanate-functional polyurethane. For good adhesion to some substrates, such a polypropylene, the grafting reaction is highly desirable.

In alternative embodiments, the polyolefin having electronegative substituents is heated with the functionalized oil or functionalized hydrocarbyl material, particularly with functionalized tung oil, to dissolve the polyolefin having electronegative substituents. Then, a diisocyanate and, optionally, other isocyanate-reactive materials are added and polyurethane polymerization is carried out. The diisocyanate may also react with acid or hydroxyl groups on the polyolefin having electronegative substituents. In certain preferred embodiments, the reaction mixture includes an isocyanate-reactive monomer having acid group. The polymerization product is then salted with a base and dispersed in water.

The aqueous embodiments of the invention may further include any of the other components already described above, including other binder or film-forming materials including other polymers or resins and crosslinking agents or curing agents, catalysts suitable for reaction of the particular crosslinker, solvents including water and organic solvents, surfactants, stabilizers, matting agents, wetting agents, rheology control agents, dispersing agents, pigments, fillers, customary coatings additives, and combinations of these.

The compositions of the invention may be used as coatings or adhesives. An organic solventborne adhesive of the invention includes the polyolefin having electronegative substituents, a polyurethane having a plurality of pendant hydrocarbyl groups (preferably provided by the reaction of a hydroxyl-functional functionalized oil with polyisocyanate), and an organic solvent such as Aromatic 100, methyl ethyl ketone, or methyl isobutyl ketone. A polyisocyanate crosslinker is preferably included to cure the composition. The composition may be a two-pack composition, with the polyolefin and polyurethane in a first pack and a liquid polyisocyanate (e.g., PAPI) in the other pack. The two packs are combined just prior to use, and the adhesive cured at ambient temperatures or with mild heat. In another alternative, the adhesive composition may be a one pack and may include a blocked polyisocyanate as curing agent. In this case, when the adhesive composition is applied, it is heated to a temperature sufficiently high to cause de-blocking of the polyisocyanate crosslinker (e.g., by loss of the blocking agent through evaporation) and thus effect cure.

The compositions of the invention may also be plastic composites, in which the binder comprises the polyolefin having electronegative substituents and at least one of the hydrocarbyl materials described above, which may also be grafted to the polyolefin as described above. The plastic composite compositions of the invention further include one or more fillers or fibers, such as glass fiber, carbon fiber, ceramic fiber.

Coating compositions can be coated on the article by any of a number of techniques well-known in the art. These include, for example, spray coating, dip coating, roll coating, curtain coating, and the like. Spray coating is preferred for automotive vehicles or other large parts. In certain embodiments, the coatings of the invention are at least about 0.1 mil thick, preferably at least about 0.2 mil thick, and may be up to about 0.6 mil thick, preferably up to about 0.4 mil thick.

The compositions of the invention can be applied as a primer or an adhesion promoter to olefinic substrates like TPO and polypropylene to provide excellent adhesion of subsequent coating layers.

In certain embodiments, the compositions containing the polyolefin having electronegative substituents and plurality of covalently joined hydrocarbyl groups can be added to a variety of coating compositions to produce coating compositions that have excellent adhesion to plastic substrates, particularly to olefinic substrates, including TPO. The coating compositions can be primers, one-layer topcoats, basecoats, and clearcoats. Primers are preferred because of the presence of the polyolefin having electronegative substituents. The coating composition can be applied directly to an uncoated and unmodified olefin-based substrate or other plastic to form a coating layer having excellent adhesion to the substrate.

The coating compositions of the invention preferably include at least about 5% by weight, preferably at least about 30% by weight of the hydrocarbyl material, based upon the total weight of nonvolatile vehicle. In certain embodiments, it is desirable to include up to about 80% by weight, preferably up to about 70% by weight, more preferably up to about 60% by weight of the hydrocarbyl material, based upon the total weight of nonvolatile vehicle. The coating compositions of the invention preferably include at least about 5% by weight, preferably at least about 20% by weight, more preferably at least about 30% by weight of the polyolefin having electronegative substituents, based upon the total weight of nonvolatile vehicle. In certain embodiments, it is desirable to include up to about 90% by weight, preferably up to about 80% by weight, more preferably up to about 70% by weight, still more preferably up to about 60% of the polyolefin having electronegative substituents, based upon the total weight of nonvolatile vehicle. When the hydrocarbyl material and the polyolefin having electronegative substituents are grafted together, these weight percentages are based on the relative amounts by weight of each in the grafted material. Vehicle is understood to be the resinous and polymer components of the coating composition, which includes film forming resins and polymers, crosslinkers, other reactive components such as the olefin-based block copolymer, the polyolefin, and other reactive or nonreactive resinous or polymeric components. The vehicle may further include at least about 5%, preferably at least about 10%, and up to about 30%, preferably up to about 25%, more preferably up to about 20% by weight of another film forming material selected from crosslinkers, other film forming polymers, oligomers, and compounds, and combinations of these.

After application to the substrate, the coating compositions of the invention are preferably thermally cured. Curing temperatures will vary depending on the particular blocking groups used in the crosslinking agents, however they generally range between 160° F. and 270° F. The curing temperature profile must be controlled to prevent warping or deformation of the TPO or polypropylene substrate or other plastic substrate. In a preferred embodiment, the cure temperature is preferably between 225° F. and 270° F., and more preferably at temperatures no higher than about 250° F. The curing time will vary depending on the particular components used, and physical parameters such as the thickness of the layers, however, typical curing times range from 15 to 60 minutes, and preferably 20-35 minutes. The most preferred curing conditions depends upon the specific coating composition and substrate, and can be discovered by straightforward testing.

The coating compositions of the invention are particularly suited to coating olefinic substrates, including, without limitation, TPO substrates, polyethylene substrates, and polypropylene substrates. The coating compositions may also be used, however, to coat other thermoplastic and thermoset substrates, including, without limitation, polycarbonate, polyurethane, and flexible substrates like EPDM rubber or thermoplastic elastomers. Such substrates can be formed by any of the processes known in the art, for example, without limitation, injection molding and reaction injection molding, compression molding, extrusion, and thermoforming techniques. The compositions of the invention provide excellent adhesion of subsequent coating layers to the substrates.

The materials and processes of the invention can be used to form a wide variety of coated articles, including, without limitation, appliance parts, exterior automotive parts and trim pieces, and interior automotive parts and trim pieces.

Adhesive compositions of the invention also have good adhesion to a variety of plastic substrates, including both TPO and polypropylene. Adhesion to polypropylene is enhanced by grafting of a polyurethane based on functionalized oil to the polyolefin having electronegative substituents.

The compositions of the invention may also be formulated for use as inks, particularly for printing on plastic substrates including polyolefins.

The compositions of the invention may be formulated for use as waterborne or solventborne sealants. The sealants are useful as TPO sealants, particularly for automotive and construction applications. The flexibility, toughness, and adhesive strength of the sealant can be tailored by changing the composition of the functionalized oil component and its amount relative to the polyolefin having electronegative substituents. The sealants include polyisocyanate crosslinkers, such as long chain polyol-based polyisocyanates. The sealant compositions may also include fillers pigments, wetting agents, and other conventional additives.

The invention is illustrated by the following examples. The examples are merely illustrative and do not in any way limit the scope of the invention as described and claimed. All parts are parts by weight unless otherwise noted.

EXAMPLES

Preparation 1

Synthesis of Functionalized Tung Oil (FTO-Ca)

Chinese tung oil (82.1 g, ~0.088 moles), trimethylolpropane (TMP) (23.6 g, ~0.176 moles) and 0.49 g of a calcium naphthenate catalyst containing about 5% calcium (CEM-ALL, by OMG Americas, Inc.) are charged into a reaction kettle equipped with stirrer, thermometer, nitrogen inlet, condenser and heat jacket. The mixture is heated to about 200° C. under nitrogen. When the reaction temperature reaches 70° C., an opaque homogeneous liquid mixture is formed with a light color and low viscosity. As the temperature reaches about 150° C., the liquid mixture becomes translucent with a light color. When the mixture is heated at 190-200° C. for about 15-20 minutes it becomes transparent and lightly colored. However, it becomes translucent again after cooling, indicating that the transesterification reaction has not been completed. After heating an additional 20-30 minutes at about 200° C., the liquid becomes transparent and remains transparent and lightly colored after cooling to room temperature. The solubility of the mixture is evaluated by mixing a portion of it with anhydrous methanol or with anhydrous ethanol, in each case at a 1:3 volume ratio (mixture to alcohol). Only about 60-70% of the mixture is miscible or soluble in the alcohols, indicating that the reaction is not complete. The mixture is then heated for about 30 minutes more at 190-200° C., at which time it has become essentially entirely soluble in each of the alcohols. The color of the mixture is slightly darker than before. The temperature of the mixture is then reduced quickly to room temperature with a nitrogen purge to prevent additional oxidative color changes. The functionalized tung oil FTO-Ca has a slightly greater viscosity and slightly higher color than the original tung oil. It has a theoretical equivalent weight of about 199.

Example 1

Aqueous Dispersion Composition of the Invention with Polyurethane Prepared with Functionalized Tung Oil (FTOPU) and Chlorinated Polyolefin (CPO) Dispersion (FTOPUR-CPO Dispersion)

A reaction kettle equipped with stirrer, heat jacket, thermometer, and nitrogen inlet, is charged with functionalized tung oil prepared as in Preparation 1 (FTO-Ca, functionality is 2 and equivalent weight is 199) 50 g, dimethylolpropionic acid (DMPA) 13.6 g, N-methylpyrrolidone (NMP) 8.6 g and dibutyltin dilaurate (T-12) 0.0075 g. The reaction kettle is heated under stirring with dry nitrogen to 60° C. until the DMPA is completely dissolved. The reaction kettle is then cooled to about 30° C. by stopping heat under stirring with nitrogen. Methylene bis(cyclohexamethylisocyanate) ($H_{12}MDI$) 107.6 g is then added and the reaction kettle is heated to 65°-70° C. to carry out the FTO-prepolymer preparation. The temperature should be kept at 70°-74° C. to avoid possible side reaction resulting in increasing the viscosity of FTO-prepolymer. When the NCO % of the FTO-prepolymer by n-dibutylamine (DBA) titration is close to the NCO % (8.5%) by calculation the preparation of FTO-prepolymer is completed. The reaction kettle is cooled to about 60°-65° C. and triethylamine (TEA) 9.23 g is then added with stirring for about 15-20 min to neutralize the pendant COOH groups of the FTO-prepolymer.

An aqueous CPO dispersion (CP 347W made by A-Line Products Corp, Detroit, Mich.) (35% by weight nonvolatiles) 313 g and water 204 g are added into the reaction kettle under vigorous agitation without purging nitrogen to carry out the dispersion. After the completion of dispersion, ethylenediamine (EDA) 9.86 g and water 9.86 g are added into the dispersion with pendant salt group-containing FTO-prepolymer under vigorous agitation to complete the final chain extension process. A homogeneous, translucent dispersion, which will be referred to as a FTOPUR-CPO dispersion, is formed. It has very good adhesion to TPO and strong mechanical properties.

This example indicates that the combination of CPO and FTOPU can be made by using CPO dispersion to replace some of water in the dispersion process of preparing FTOPU dispersion. The combination product shows both properties of CPO and FTOPU. The CPO dispersion may attend some reaction when it is added into the neutralized FTO-prepolymer because FTOPUR-CPO dispersion shows no phase separation.

Example 2

Composition of the Invention without Chain Extension (Ftopu Dispersion)

This example prepares an FTOPU dispersion without chain extension. The reaction kettle is the same as the one described in Example 1. FTO-Ca (from Preparation 1) 54 g, NMP 30 g, and DMPA 18.2 g are added into the reaction kettle. The reactants are heated to about 90° C. until the DMPA particle disappears. The reaction kettle is then cooled to about 60°-65° C. to obtain the fine DMPA particles, then toluene diisocyanate (TDI) 37.8 g is slowly added to control the reaction among FTO-Ca, DMPA and TDI, which is a vigorous, exothermal reaction. The temperature is kept at 90°-95° C. and triethanolamine (TEAL) 20 g as well as NMP 24 g are added after about 30 min. to neutralize the pendant COOH-containing FTOPU product formed at NCO/OH=0.95/1.0. About 10-15 min later, hot water (70°-80° C.) 240 g is added to carry out the dispersion under vigorous agitation. A transparent, light brown FTOPU dispersion is obtained. It is blended with the CPO dispersion used in Example 1 (CP 347W made by A-Line Products Corp, Detroit, Mich.) at different solids weight ratios at shown in Table 1 and adhesion to various substrates is tested as follows.

Aqueous CPO dispersion (CP 347W made by A-Line Products Corp, Detroit, Mich.) (35% by weight nonvolatiles) is blended with above FTOPU at eight different solids weight ratios and each blend is applied to polypropylene (PP), thermoplastic polyolefin (TPO) and reactive TPO (RTPO) panels, respectively. The panels are then baked in the oven at 80° C. for 20-30 min. The crosshatch adhesion test is carried out on these panels after 24 hrs at room temperature and the results are shown below Table 1

TABLE 1

Various solids weight ratios of CPO dispersion and FTOPU dispersion on the crosshatch adhesion test for different plastic panels

| EXAMPLE | 2A | 2B | 2C | 2D | 2E | 2F | 2G | 2H |
|---|---|---|---|---|---|---|---|---|
| CPO/FTOPU (Solids ratio) | 1/7 | 1/6 | 1/5 | 1/4 | 1/3 | 1/2 | 1/1 | 1/0.5 |
| Crosshatch adhesion* | | | | | | | | |
| PP | F | F | F | F | F | F | F | F |
| RTPO | F | F | F | F | FP** | P | P | P |
| TPO | F | F | F | F/P | P | P | P | P |

*F-Failure, P-Pass
**Sometime failure and sometime pass

The test results in Table 1 show that it is more difficult to adhere to the PP compared to RTPO and TPO, even when the weight ratio of chlorinated polyolefin to polyurethane based on functionalized tung oil (FTOPU) is 1/0.5. Good adhesion to the RTPO is achieved at a weight ratio CPO/FTOPU of 1/2 and good adhesion to TPO is achieved at a weight ratio CPO/FTOPU of 1/3. The coatings or adhesives to the TPO, RTPO or PP must pass the crosshatch test in order to measure the lap shear strength, otherwise the test samples will be separated in the sample holder before starting testing.

Example 3

Composition of the Invention with FTOPU and CPO Reaction in Solvent Based, 2K Adhesives Three types of chlorinated polyolefin, CPO 343, 164 and 730 (available from Eastman Chemical Co.) have been used to investigate adhesion of compositions of the invention to TPO and PP after reacting with FTOPU. Both functionalized tung oils containing two functional groups and one functional group are used to make these 2K, CPO-FTO polyurethane, solvent-based adhesive with PAPI 94 (polyarylpolyisocyanate made by Dow Chem. Co.). The part A is a mixture of the functionalized tung oil indicated in Table 2 (below) and the CPO resin indicated in Table 2 (below) in a solvent, Aromatic 100, at 1.0/1.0 weight ratio of CPO/FTO (on solids). FTO-Ca is prepared according to Preparation 1, above. Preparations for the remaining functionalized tung oils follow the table. In one sample, the part A mixture has a weight ratio of 1.0/2.0 (CPO/FTO). The part B is PAPI 94 without any solvent. To make the part A solutions, both the FTO and the CPO resin are placed in a glass beaker, and the Aromatic 100 solvent is then added to have a solids content 32-47%. The glass beaker is heated under stirring at about 40-50° C. for about 20-30 min. until a homogeneous solution is obtained. After the CPO-FTO solution has been cooled to room temperature, the PAPI 94 is then added into the beaker at equivalents ratio NCO/OH=1.0/1.0 to obtain the 2K CPO-FTO polyurethane adhesive. The 2K adhesive is applied on test strip (16 mm×60 mm, PP or TPO) and a lap shear adhesion test sample is prepared by lapping a second test strip over the first, with the adhesive sandwiched between the two test strips. The lapped test strips are placed into an oven at 80° C. for 20 min., followed by 24 hrs at room temperature. The lapped test strips are kept at room temperature for 24 hrs before measuring the lap shear strength in a computerized Instron Tester Model 5565 (by Instron Corp.). The 2K adhesive has a pot life at room temperature of about 1-2 hrs.

The following Table 2 shows the lap shear strength of the various 2K solvent-based adhesives of this example using TPO and PP substrates.

TABLE 2

Lap shear strength of 2K adhesives based on CPO/FTO and PAPI 94 using different CPO resins and FTO

| Ex. No. | CPO | FTO* | CPO/FTO (weight) | CPO/FTOPU (weight) | Lap shear, psi TPO | Lap shear, psi PP | Failure** TPO | Failure** PP |
|---|---|---|---|---|---|---|---|---|
| 3.1 | 343 | FTO-Ca | 1.0/1.0 | 1/1.66 | 353 | 11 | C | A |
| 3.2 | 343 | FTO-Li | 1.0/1.0 | 1/1.66 | 266 | 88 | C | A |
| 3.3 | 343 | FTO11-Ca | 1.0/1.0 | 1/1.37 | 405 | 175 | C | A |
| 3.4 | 164 | FTO-Ca | 1.0/1.0 | 1/1.66 | 376 | 180 | C | A |
| 3.5 | 164 | FTO-Li | 1.0/1.0 | 1/1.66 | 432 | 85 | C | A |
| 3.6 | 164 | FTO11-Ca | 1.0/1.0 | 1/1.37 | 393 | 154 | C | A |
| 3.7 | 730 | FTO-Li | 2.0/1.0 | 1/1.01 | 304 | 156 | C | A |
| 3.8 | 730 | FTO11-Ca | 1.0/1.0 | 1/1.37 | 399 | 225 | C | A |

**C is cohesive failure and A is adhesive failure

FTO-Ca is made by Preparation 1, above.

Preparation 2

Synthesis of Functionalized Tung Oil Using Lithium Catalyst (FTO-Li)

FTO-Li is prepared according to the procedure of Preparation 1 except the calcium naphthenate is replaced by lithium carbonate, 0.49 g. The product is filtered after completion of the reaction so that the resultant FTO-Li has no or very little residual lithium carbonate.

Preparation 3

Synthesis of Functionalized Tung Oil with one Hydroxyl Group (FTO11-Ca)

FTO11-Ca is prepared according to the procedure of Preparation 1 except that the amount of TMP is changed to 11.8 g. The resultant FTO11-Ca has one functionality instead of the two in FTO-Ca The test results shown in the above Table 2 indicate that the 2K solvent-based CPO-FTO polyurethane (CPO-FTOPU) adhesives show very good adhesion to both TPO and PP. The CPO/FTOPU weight ratio as shown in above Table 2 is lower than 1.0/1.0 except for Example 3.7. If there is no reaction or grafting between CPO and FTOPU, it is not impossible to have adhesion to the PP as mentioned in Example 2 Table 1, where the cold blends are prepared with no any reaction between CPO and FTOPU because the separate CPO and FTOPU dispersion products are just physically mixed at different weight ratios. The above Table 2 also indicates that the FTO with low functionality (one hydroxyl group) shows good adhesive strength. It is also interesting to find that the CPO 164 is very compatible with the FTO compounds compared to CPO 343 and 730. The CPO164-FTO composition can be formulated at 47% solids content with low viscosity, but the CPO730-FTO only be formulated at 32% solids with workable viscosity. The CPO343-FTO is in between. Example 3.7 has more CPO730, but the adhesive strength doesn't improve. Some of test strips in CPO164 and CPO343 are broken during testing. It means that the adhesive strength is higher the TPO material itself. Both CPO 164 and CPO 343 show better adhesive strength than CPO 730, presumably because the CPO 730 has very low acid group content resulting in less reaction or grafting with the isocyanate group as compared to CPO 164 and CPO343. The phenol/formaldehyde structure inside CPO164 is very compatible with the FTO; therefore it shows better results than CPO343 even at a lower acid number than CPO343.

Example 4

Composition of the Invention with FTOPU and CPO Reaction in Solvent Based, 2K Adhesives This example investigates the effect of the weight ratios of FTO/CPO or FTOPU/CPO on the lap shear strength of 2K CPO-FTOPU adhesive to PP. Two CPO resins (CPO 343 and CPO 730 from Eastman Chemical) are used with FTO-Ca (made according to Preparation 1). The preparation of the 2K solvent-based adhesives and sample test strips as well as testing using the Instron tester are the same as described above in Example 3. The part A is the solution mixture of CPO resin and FTO-Ca. The part B is PAPI 94. The mixing ratio of part A to B is based on the equivalent ratio NC/OH=1.0/1.0.

The test strips are cleaned by with isopropanol (IPA) to remove possible release agent before applying the adhesive sample to the surface. The results are shown below in Table 3.

TABLE 3

Effect of different CPO resins and CPO/FTO or CPO/FTOPU ratios in 2K adhesives on the lap shear strength to PP

| No. | CPO | CPO/FTO | CPO/FTOPU | Lap shear, psi |
|-----|-----|---------|-----------|----------------|
| 4.1 | 343 | 1/2 | 1/3.3 | 158 |
| 4.2 | 343 | 1/1 | 1/1.9 | 160 |
| 4.3 | 343 | 2/1 | 1/0.8 | 129 |
| 4.4 | 730 | 1/2 | 1/3.3 | 117 |
| 4.5 | 730 | 1/1 | 1/1.7 | 115 |
| 4.6 | 730 | 2/1 | 1/0.8 | 85 |

The results of Table 3 indicate that the 2K adhesive based on CPO 343 shows better adhesion to PP than CPO 730. They also show that the adhesive strength is decreased after increasing the CPO resin in the adhesive sample. The results indicate again that the adhesion to PP is still good when the CPO/FTOPU weight ratio is 1.0/1.0 and 1.0/2.0, respectively. This ratio, however, would not be expected to have good adhesion to PP using cold blending CPO dispersion with FTOPU dispersion as shown Example 2 Table 1. Therefore it implies that the grafting reaction between CPO resin and FTOPU does occur involving the active hydrogen of acid group in CPO resin and the NCO group of PAPI 94 as well as the OH group of FTO. As a result, a graft-IPN (interpenetrating polymer network) is believed to be formed resulting in better adhesive strength compared to the cold blend made by physically cold-blending process.

Example 5

Waterborne CPO-FTOPU Adhesive Compositions of the Invention

This example describes the preparation of a waterborne CPO-FTOPU adhesive. It is different as compared to Example 1 where the CPO dispersion is used to replace water not using the CPO solid resin. The possible extent of reaction between acid groups of CPO and NCO groups of the salt group-containing polyurethane is believed to be lower than the 2K solvent-based adhesive system above, where there is enough time to carry out the reaction among acid group of CPO resin, NCO group of PAPI94 and the OH group of FTO during baking in the oven. The dispersion time is short (about 3-5 min.) at room temperature followed by the chain extension with aliphatic diamine for the preparation of polyurethane dispersion. Now the CPO resin is used in the preparation of FTO-PUR (FTO-based polyurethane) with no chain extension. The equipment is the same as described in Example 1. Three types of FTO are used. They are FTO-CA (Functionality is 2.0) made as in Preparation 1, FTO11-Ca (Functionality is 1.0) made as in Preparation 3, and FTO1.5 (Functionality is 1.5) made according to Preparation 4, which follows Table 4. A pre-neutralized DMPA (dimethylol propionic acid)-TEA (triethylamine) adduct with 76% solids content in NMP (N-methylpyrrolidone) is prepared. This adduct is a liquid, as compared to the solid DMPA used in examples above. The equivalency ratios of NCO/OH (0.95/1.0) and DMPA-TEA/OH (2.0/1.0) are the same for each FTOPU. The amount of CPO 164 resin is the same as the amount of FTOPU. The formulations are shown below Table 4.

TABLE 4

FTOPU-CPO 164 dispersions based on FTOs with different functionalities

| | EXAMPLE | | |
|---|---|---|---|
| | 5-a | 5-b | 5-c |
| FTO2.0 | 25 | — | — |
| FTO1.5 | — | 25 | — |
| FTO1.0 | — | — | 25 |
| DMPA-TEA | 38.9 | 30.8 | 21.8 |
| $H_{12}$MDI | 46.9 | 37.2 | 26.4 |
| CPO164 | 5.8 | 6.3 | 6.3 |
| NMP | 25 | 25 | 25 |
| CPO164 | 11.6 | 18.8 | 18.8 |
| Water | 192 | 147 | 177 |
| NCO/OH | 0.95/1.0 | 0.95/1.0 | 0.95/1.0 |
| DMPA-TEA/OH | 2.0/1.0 | 2.0/1.0 | 2.0/1.0 |

Preparation 4

Synthesis of Functionalized Tung Oil with, on Average, 1.5 Hydroxyl Groups (FTO1.5)

FTO1.5 is prepared according to the procedure of Preparation 1 except that the amount of TMP is changed to 17.7 g. The resultant FTO1.5 has an average one and one-half functionality.

Preparation of Examples 5-a, 5-b, and 5-c

FTO, DMPA-TEA, NMP, $H_{12}$MDI and a first part of CPO164 are charged into the reactor and the reaction is carried out by gradually heating to 80° C. under dry nitrogen with stirring. This is an exothermal reaction and the reaction temperature should be kept not higher than 110° C. to avoid any side reaction resulting in high viscosity before dispersion. Bubbles appear as the viscosity increases. When the bubbles disappear and the viscosity is high but no longer increasing, a second part of CPO164 is added into the reactor. After the CPO164 resin is completely dissolved, hot water (80-90° C.) is then added with vigorous agitation to carry out the dispersion. Homogeneous, opaque FTOPU-CPO dispersions are obtained. All these FTOPU-CPO dispersions show good adhesion to TPO and very strong mechanical properties, producing a hard, glossy and sandable coating on the TPO substrate. These stable, opaque dispersions do not show any precipitation on the bottom of sample containers (i.e., instability) after weeks. The hardness and strength of the coating on the TPO decrease with decreasing functionality of the FTO (from two to 1.5 to one functional group on average). However, the flexibility of the coatings on the TPO increases from two to 1.5 to one functional group on average in the FTO. This example indicates that the CPO164 is compatible with FTO and reacts with isocyanate resulting in FTOPU-CPO dispersions without any external surfactant or wetting agent being employed. All samples show good adhesion to the TPO and stability without precipitate during storage, even though they form opaque, not translucent dispersions.

Example 6

Composition of the Invention

In order to obtain a fine particle size of the final dispersions, an aqeuous CPO dispersion is used instead of the solid CPO resin as is used in the previous example. Three aliphatic diisocyanates $H_{12}$MDI (hydrogenated MDI), IPDI (isophorone diisocyanate) and TMXDI (para-tetramethylxylene diisocyanate) are used. FTO1.5 (Preparation 4) is used. The NCO/OH equivalent ratio is 0.97/1.0 and COOH/OH equivalent ratio is 1.6/1.0. The equipment is the same as described in Example 1. Examples 6-a, 6-b, and 6-c are prepared using the ingredients (listed in parts by weight) shown below in Table 5.

TABLE 5

FTOPU-CPO 343 dispersions based on FTO 1.5 and different Aliphatic diisocyanates

| No | 6-a | 6-b | 6-c |
|---|---|---|---|
| FTO1.5 | 25 | 25 | 25 |
| DMPA | 10.7 | 10.7 | 10.7 |
| H12MDI | 33.04 | — | — |
| IPDI | — | 28 | — |
| TMXDI | — | — | 30.8 |
| NMP | 15 | 15 | 15 |
| TEAL | 11.9 | 11.9 | 11.9 |
| Water | 5 | 5 | 5 |
| Hot water (80-90° C.) | 40 | 40 | 40 |
| CPO343 dispersion (27%) | 59 | 59 | 59 |
| Hot water (80-90° C.) | 122 | 111 | 117 |
| Solids, % | 30 | 30 | 30 |
| Adhesion to TPO | Pass | Pass | Pass |
| Adhesion to RTPO | Fail | Fail | Pass |

Preparation of Examples 6-a, 6-b, and 6-c

FTO1.5, DMPA, NMP and diisocyanate as shown in above Table 6 are charged into a reaction kettle and the reaction is carried out by gradually heating to 80° C. under dry nitrogen and stirring. This is an exothermal reaction and the reaction temperature is kept not higher than 110° C. to avoid the side reaction that would result in high viscosity before dispersion. The viscosity increases and a lot of bubbles appear as the reaction proceeds. When the bubbles disappear, and the viscosity is high but no longer increasing, the TEAL and 5 g of water are added into the reactor under vigorous agitation to quickly mix the reaction product. The hot water (80-90° C.) 40 g is then added under vigorous agitation. After few minutes the CPO343 dispersion is then added as quickly as possible with vigorous agitation. When the mixture becomes uniform after 3-5 min. the second amount of the hot water as shown in above Table 6 is then added. Homogeneous, translucent FTOPU-CPO dispersions prepared with the different diisocyanates are obtained. All these dispersions show very fine particle sizes and have very good adhesion to TPO. In particular the sample 6-c based on TMXDI shows better adhesion than the dispersions based on $H_{12}$MDI and IPDI. It was found that the sample 6-c even shows good adhesion to PP (polypropylene) and RTPO (reactive TPO).

Example 7

Composition of the Invention

All of above examples are anionic FTO-CPO dispersions using the DMPA to introduce the pendant COOH group that is salted to carry out the dispersion. In this example, a cationic FTO1.5PUD and CPO dispersion is prepared. The equipment is the same as that described in above example 6. The formulation is shown below (amounts are in grams):

TABLE 6

Cationic FTO1.5-CPO dispersion

| FTO1.5 | 25 |
|---|---|
| NMDEA | 11.9 |
| H12MDI | 38 |
| NMP | 10 |
| HAC | 6 |
| Hot water | 60 |
| CPO343 dispersion (27%) | 59 |
| Hot water | 60 |

FTO1.5 25 g (Preparation 4), NMDEA 11.9 g, NMP 10 g and $H_{12}$MDI 38 g are charged in a reaction kettle which is the same as that described in above example 6. The kettle is heated in the purge of nitrogen and under mild agitation until the temperature is about 80-90° C. not higher than 110° C. for about 40-50 min. When the viscosity is high and there is no free NCO (as determined by titration with dibutylamine or infrared spectroscopy) the HAC (Acetic acid) and hot water (70-80° C.) are then added under vigorous agitation. After about 2-3 min. the CPO343 dispersion is then added under vigorous agitation for 3-5 min. and the rest of the hot water is then added under agitation to generate the cationic FTO1.5PUD-CPO dispersion. The final dispersion has fine particle size and shows good adhesion to TPO.

Example 8

Composition of the Invention

A CPO dispersion with a three component-IPN (interpenetrating polymer network) is prepared in this example. The equipment is the same as described in Example 1. The formulation is shown below Table 7.

TABLE 7

Three components IPN-based CPO dispersion

| CPO343 | 61 g |
|---|---|
| Makon 12 | 12 g |
| Ethylene Glycol (EG) | 5.5 g |
| AMP95 | 4 g |
| Water | 5 g |
| Hot water | 40 g |
| FTO1.5PUD (27%) | 118 g |
| Acry Blend (22%) | 116 g |
| Water | 30 g |
| CPO/FTO-Acryblend | 1.2/1.0 equivalents ratio |
| FTO/Acryblend | 1.25/1.0 equivalents ratio |
| Solids, % | 30 |
| Adhesion to TPO | Pass |
| Adhesion to RTPO | Pass |
| Adhesion to PP | Pass |

The CPO343 solid resin, EG and Makon12 (nonyl phenol ethoxylate poe-12, hydroxyl value 76) as shown in above Table 7 are charged into a reaction kettle which is equipped with heating jacket, stirrer and nitrogen inlet. The reaction kettle contents are heated in the nitrogen and under mild agitation to about 110-120° C. until a homogeneous liquid is obtained. A mixture of AMP95 and water (5 g.) is then added as quickly as possible. After mixing with a short time (1-2 min.) under vigorous agitation the hot water (80-90° C.) is then added under vigorous agitation to obtain a homogeneous dispersion. A mixture of FTO1.5PUD, an aqueous polyurethane dispersion prepared from FTO1.5 (Preparation 4) as in Example 6-c before addition of CPO (118 g,) and acrylic blend (116 g, made from Johncryl 95, 62 and 52 obtained from S. C. Johnson) is then added under vigorous agitation for about five to ten minutes in order to generate a very homogeneous dispersion. Finally the rest of hot water 30 g is then added under agitation to obtain the three component-IPN dispersion. It is a translucent and homogeneous dispersion with good adhesion to TPO, RTPO and PP.

Example 9

Composition of the Invention

This example is the same as above example 8 except that a cationic FTO1.5PUD prepared according to Example 7 (using NMDEA) is used. The anionic AcryBlend is not used because it is an anionic acrylic dispersion which is not compatible with cationic FTO1.5PUD. However, the cationic FTO1.5PUD is compatible with nonionic CPO 343 dispersion because the Makon 12 is an nonionic surfactant. The equipment is the same as described in Example 8. The formulation is shown below in Table 8

TABLE 8

| Three components IPN-based CPO dispersion | |
|---|---|
| CPO 343 | 61 g |
| Makon 12 | 12 g |
| Ethylene Glycol (EG) | 5.5 g |
| AMP95 | 4 g |
| Water | 5 g |
| Hot water | 40 g |
| FTO1.5PUD (27%) | 188 g |
| Water | 30 g |
| CPO/FTO1.5PUD | 1.2/1.0 equivalents ratio |
| Solids, % | 33 |
| Adhesion to TPO | Pass |
| Adhesion to RTPO | Pass |
| Adhesion to PP | Pass |

The CPO343 solid resin, EG and Makon12 as shown in above Table 8 are charged into a reaction kettle which is equipped with heating jacket, stirrer and nitrogen inlet. The reaction kettle is heated in the nitrogen and under mild agitation to about 110-120° C. until a homogeneous liquid is obtained. The mixture of AMP95 and water is then added as quickly as possible. After mixing in a short time (1-2 min.) under vigorous agitation the hot water (80-90° C.) is then added under vigorous agitation to obtain a homogeneous dispersion. A cationic FTO1.5PUD (188 g, prepared as in Example 7 up to addition of CPO) is then added under vigorous agitation for about five to ten minutes in order to generate a very homogeneous dispersion. Finally the rest of hot water 30 g is then added under agitation to obtain the CPO-cationic FTO1.5PUD dispersion. It is a translucent and homogeneous dispersion with good adhesion to TPO, RTPO and PP.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An aqueous coating composition, comprising an acid-functional or carboxylic acid anhydride-functional, chlorinated polyolefin esterified with a hydroxyl-functional reaction product of a fatty acid or reactive derivative thereof with a polyol having at least three primary hydroxyl groups.

2. An aqueous coating composition according to claim 1, wherein the fatty acid or reactive derivative thereof comprises tung oil.

3. An aqueous coating composition according to claim 1, wherein the hydroxyl-functional reaction product is the reaction product of tong oil and trimethylolpropane.

4. An aqueous coating composition according to claim 1, further comprising a curing agent.

5. A method of coating an article, comprising applying to the article a composition according to claim 1.

6. A method according to claim 5, further comprising curing the applied composition.

7. An organic-solvent borne, two-part adhesive composition, comprising a first part comprising a polyolefin having electronegative substituents and a hydroxyl-functional ester that is the reaction product of tung oil and a polyol, the polyol having at least three primary hydroxyl groups in organic solvent, and a second part comprising a polyisocyanate, wherein the first and second parts are a two-part adhesive.

8. An adhesive composition, comprising
(a) a polyolefin having electronegative substituents,
(b) a hydroxyl-functional ester consisting of the reaction product of an unsaturated fatty acid or reactive derivative thereof and a polyol having at least three primary hydroxyl groups, wherein the hydroxyl-functional ester comprises a member selected from the group consisting of

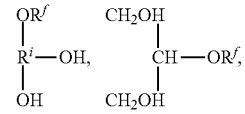

and combinations thereof, wherein $R^i$ represents a residue of the polyol compound and $R^f$ represents a residue of the fatty acid or reactive derivative thereof, and
(c) a blocked polyisocyanate.

9. A composition consisting essentially of
(a) a polyolefin having electronegative substituents,
(b) a hydroxyl-functional ester consisting of the reaction product of an unsaturated fatty acid or reactive derivative thereof and a polyol having at least three primary hydroxyl groups, wherein the hydroxyl-functional ester comprises a member selected from the group consisting of

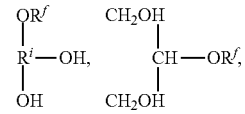

and combinations thereof, wherein $R^i$ represents a residue of the polyol compound and $R^f$ represents a residue of the fatty acid or reactive derivative thereof;
optionally,
(c) one or more members selected from the group consisting of water and organic solvents;
optionally,
(d) one or more pigments;
optionally,
(e) one or more members selected from the group consisting of ammonia, tertiary amines, aminoalcohols, driers, catalysts, surfactants, stabilizers, matting agents, wetting agents, rheology control agents, dispersing agents, fillers, and coatings additives;

optionally, (f) a crosslinker or curing agent reactive with the polyolefin, the hydroxyl-functional ester, or both the polyolefin and the hydroxyl-functional ester;

and optionally, (g) one or more members selected from the group consisting of catalysts, driers, surfactants, stabilizers, matting agents, wetting agents, rheology control agents, dispersing agents, fillers, coatings additives, and combinations thereof.

10. A composition comprising a vehicle consisting of
(a) a polyolefin having electronegative substituents,
(b) a hydroxyl-functional ester consisting of the reaction product of an unsaturated fatty acid or reactive derivative thereof and a polyol having at least three primary hydroxyl groups, wherein the hydroxyl-functional ester comprises a member selected from the group consisting of

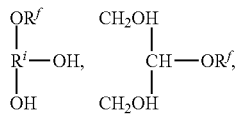

and combinations thereof, wherein $R^i$ represents a residue of the polyol compound and $R^f$ represents a residue of the fatty acid or reactive derivative thereof;

optionally, (c) a crosslinker or curing agent reactive with the polyolefin, the hydroxyl-functional ester, or both the polyolefin and the hydroxyl-functional ester.

11. An aqueous coating composition prepared by method comprising
(a) combining a hydroxyl-functional material having a plurality of hydrocarbyl groups of at least seven carbon atoms and a polyolefin having electronegative substituents to form a first combination, wherein the hydroxyl-functional material is the reaction product of a fatty acid or reactive derivative thereof with a polyol having at least three primary hydroxyl groups;
(b) reacting the first combination with at least a polyisocyanate to form a polyurethane reaction product comprising the polyolefin; and
(c) dispersing the polyurethane product in water.

12. An aqueous coating composition according to claim 11, wherein the first combination is a mixture of the hydroxyl-functional material and the polyolefin.

13. An aqueous coating composition according to claim 11, wherein the hydroxyl-functional material is the reaction product of a fatty acid or reactive derivative thereof with a polyol having at least three primary hydroxyl groups.

14. An aqueous coating composition according to claim 13, wherein the fatty acid or reactive derivative thereof comprises tung oil.

15. An aqueous coating composition according to claim 13, wherein the hydroxyl-functional reaction product is the reaction product of tung oil and trimethylolpropane.

16. An aqueous coating composition according to claim 13, further comprising a curing agent.

17. A method of coating an article, comprising applying to the article a composition according to claim 13.

18. A method according to claim 17, further comprising curing the applied composition.

19. A method of making a composition, comprising:
(a) combining a hydroxyl-functional material having a plurality of hydrocarbyl groups of at least seven carbon atoms and a polyolefin having electronegative substituents to form a first combination, wherein the hydroxyl-functional material is the reaction product of a fatty acid or reactive derivative thereof with a polyol having at least three primary hydroxyl groups and wherein the hydroxyl-functional material comprises a member selected from the group consisting of

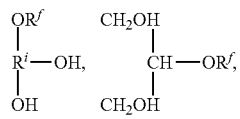

and combinations thereof, wherein $R^i$ represents a residue of the polyol compound and $R^f$ represents a residue of the fatty acid or reactive derivative thereof;

(b) reacting the first combination with at least a polyisocyanate to form a polyurethane reaction product comprising the polyolefin; and
(c) dispersing the polyurethane product in water.

20. A method of making a composition according to claim 19, wherein the first combination is a reaction product of the hydroxyl-functional material and the polyolefin.

21. A method of making a composition according to claim 19, wherein the first combination is a mixture of the hydroxyl-functional material and the polyolefin.

* * * * *